United States Patent
Kim et al.

(10) Patent No.: US 10,616,407 B2
(45) Date of Patent: Apr. 7, 2020

(54) ELECTRONIC DEVICE FOR DISPLAYING CALL-RELATED INFORMATION AND OPERATION METHOD THEREOF

(71) Applicant: Samsung Electronics Co., Ltd., Gyeonggi-do (KR)

(72) Inventors: Jihyun Kim, Seoul (KR); Minseo Kang, Seoul (KR); Yonghak Kim, Gyeonggi-do (KR); Sujeong Lim, Gyeonggi-do (KR); Jaehwan Kim, Gyeonggi-do (KR); Dohoon Kim, Gyeonggi-do (KR); Myung-Ho Kim, Gyeonggi-do (KR); Sunyong Kim, Seoul (KR); Seung Woo Park, Gyeonggi-do (KR); Jongwon Seo, Gyeonggi-do (KR); An-Ki Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/935,518

(22) Filed: Mar. 26, 2018

(65) Prior Publication Data

US 2018/0278744 A1    Sep. 27, 2018

(30) Foreign Application Priority Data

Mar. 24, 2017 (KR) .......................... 10-2017-0037515

(51) Int. Cl.
*H04M 3/42* (2006.01)
*H04M 3/22* (2006.01)
(Continued)

(52) U.S. Cl.
CPC ........ *H04M 3/42068* (2013.01); *H04L 67/36* (2013.01); *H04M 1/274516* (2013.01);
(Continued)

(58) Field of Classification Search
USPC .............. 455/415, 423; 379/142.01; 370/419
See application file for complete search history.

(56) References Cited

U.S. PATENT DOCUMENTS 8,938,223 B2 *   1/2015   Ashtikar ............. H04M 3/4365
                                                         379/142.01
2003/0022659 A1 * 1/2003   Mun ..................... H04M 1/576
                                                         455/415
(Continued)

FOREIGN PATENT DOCUMENTS

EP    3 007 414       4/2016
KR    20010017386     3/2001
(Continued)

OTHER PUBLICATIONS

International Search Report dated Jul. 9, 2018 issued in counterpart application No. PCT/KR2018/003482, 11 pages.
(Continued)

*Primary Examiner* — David Q Nguyen
(74) *Attorney, Agent, or Firm* — The Farrell Law Firm, P.C.

(57) ABSTRACT

Provided are an electronic device, a method thereof, and a server. The electronic device includes a display, a communication interface, at least one processor, and a memory electrically connected to the processor, wherein, upon execution, the memory is configured to store instructions that enable the at least one processor to detect that a call event associated with another electronic device occurs; obtain call-related information associated with the another electronic device; detect at least one piece of information corresponding to a call state with the another electronic device from the obtained call-related information; and control the display to display a screen including the at least one piece of detected information and information indicating the
(Continued)

call state with the another electronic device. Other embodiments may be possible.

20 Claims, 24 Drawing Sheets

(51) Int. Cl.
    *H04M 1/725*     (2006.01)
    *H04M 1/2745*     (2020.01)
    *H04M 1/57*     (2006.01)
    *H04M 7/00*     (2006.01)
    *H04L 29/08*     (2006.01)

(52) U.S. Cl.
    CPC ....... *H04M 1/575* (2013.01); *H04M 1/72522* (2013.01); *H04M 1/72597* (2013.01); *H04M 3/2218* (2013.01); *H04M 7/0033* (2013.01); *H04L 67/26* (2013.01); *H04M 2201/36* (2013.01); *H04M 2201/38* (2013.01); *H04M 2203/60* (2013.01)

(56) References Cited

U.S. PATENT DOCUMENTS

| | | | |
|---|---|---|---|
| 2004/0097224 A1* | 5/2004 | Lim | H04M 3/42 |
| | | | 455/425 |
| 2006/0073817 A1 | 4/2006 | Lee | |
| 2007/0087789 A1 | 4/2007 | Lee et al. | |
| 2007/0183440 A1* | 8/2007 | Bennet | H04M 1/2535 |
| | | | 370/419 |
| 2008/0032687 A1* | 2/2008 | Mathewson | H04M 3/42042 |
| | | | 455/423 |
| 2012/0036154 A1 | 2/2012 | Vellaikal | |
| 2012/0202472 A1* | 8/2012 | Park | H04M 1/274516 |
| | | | 455/415 |
| 2014/0274002 A1 | 9/2014 | Hogan et al. | |
| 2015/0195400 A1* | 7/2015 | Faaborg | H04M 3/42042 |
| | | | 455/415 |
| 2015/0363059 A1* | 12/2015 | Tsunoda | H04M 1/274583 |
| | | | 715/739 |
| 2017/0214789 A1 | 7/2017 | Jung et al. | |

FOREIGN PATENT DOCUMENTS

| | | |
|---|---|---|
| KR | 20010017386 A * | 3/2001 |
| KR | 10-0387707 | 6/2003 |
| KR | 100440208 | 7/2004 |
| KR | 100440208 B1 * | 7/2004 |
| KR | 1020050089425 | 9/2005 |
| KR | 1020070037554 | 4/2007 |
| KR | 10-2011-0110403 | 10/2011 |
| KR | 10-2013-0069317 | 6/2013 |
| KR | 10-2014-0087255 | 7/2014 |
| KR | 10-2015-0048936 | 5/2015 |
| KR | 1020160015825 | 2/2016 |

OTHER PUBLICATIONS

European Search Report dated Dec. 18, 2019 issued in counterpart application No. 18771321.9-1213, 8 pages.

* cited by examiner

ELECTRONIC DEVICE FOR DISPLAYING CALL-RELATED INFORMATION AND OPERATION METHOD THEREOF

CROSS-REFERENCE TO RELATED APPLICATION(S)

This application is based on and claims priority under 35 U.S.C. § 119 to a Korean Patent Application No. 10-2017-0037515, filed on Mar. 24, 2017, in the Korean Intellectual Property Office, the disclosure of which is incorporated by reference herein in its entirety.

BACKGROUND

1. Field

The present disclosure relates generally to a method and apparatus for displaying various information by an electronic device, and more particularly, to an electronic device for displaying call related information, and a method thereof.

2. Description of Related Art

Due to the recent rapid development of electronic devices, electronic devices which can perform a wireless voice call and information exchange have become daily necessities. Electronic devices provide a voice call and video call service to enable communication among users of the electronic devices. When a call event occurs, the electronic device may display identification information of a partner electronic device on a screen so that a user can recognize a user of the call partner electronic device. For example, when an incoming call event occurs, the electronic device displays the phone number and/or user name of a caller electronic device.

The above information is presented as background information only to assist with an understanding of the present disclosure. No determination has been made, and no assertion is made, as to whether any of the above might be applicable as prior art with regard to the present disclosure.

SUMMARY

When an incoming call event occurs, an electronic device displays at least one of a caller phone number and a user name based on whether the caller phone number is registered in a contact information database. For example, when the caller's phone number is not registered in the contact information database, the electronic device displays only the caller's phone number. In this instance, a user of the electronic device can not recognize a user of the partner electronic device and/or the purpose of the call and thus, the user may have difficulty in determining whether to connect the incoming call. In addition, the electronic device displays the phone number and/or the user name of the partner electronic device during a period from the start point of a call event to the end point of the call, and thus, may fail to satisfy the user who desires to obtain various information related to the incoming call.

In accordance with an aspect of the present disclosure, an electronic device is provided. The electronic device includes a display, a communication interface, at least one processor, and a memory electrically connected to the processor, wherein, upon execution, the memory is configured to store instructions that enable the at least one processor to detect that a call event associated with another electronic device occurs; obtain call-related information associated with the another electronic device; detect at least one piece of information corresponding to a call state with the another electronic device from the obtained call-related information; and control the display to display a screen including the at least one piece of detected information and information indicating the call state with the another electronic device.

In accordance with another aspect of the present disclosure, a server is provided. The server includes a communication interface, at least one processor, and a memory electrically connected to the processor, wherein, upon execution, the memory is configured to store instructions to enable at least one processor to obtain call-related information associated with at least one electronic device; receiving a signal for requesting call-related information associated with a second electronic device from a first electronic device; and control the communication interface to transmit the call-related information associated with the second electronic device to the first electronic device in response to the received signal, and wherein the communication-related information includes at least one of at least one piece of information corresponding to a call connection attempt state, at least one piece of information corresponding to a call-connected state, or at least one piece of information corresponding to a call-terminated state.

In accordance with another aspect of the present disclosure, an operation method of an electronic device includes detecting that a call event associated with another electronic device occurs; obtaining call-related information associated with the other electronic device; detecting at least one piece of information corresponding to a call state with the other electronic device from the obtained call-related information; and displaying a screen including the at least one piece of detected information and information indicating the call state with the other electronic device.

In accordance with another aspect of the present disclosure, a method of an electronic device is provided. The method includes detecting that a call event associated with another electronic device occurs; obtaining call-related information associated with the another electronic device; detecting at least one piece of information corresponding to a call state with the another electronic device from the obtained call-related information; and displaying a screen including the at least one piece of detected information and information indicating the call state with the another electronic device.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION

Figure 1:
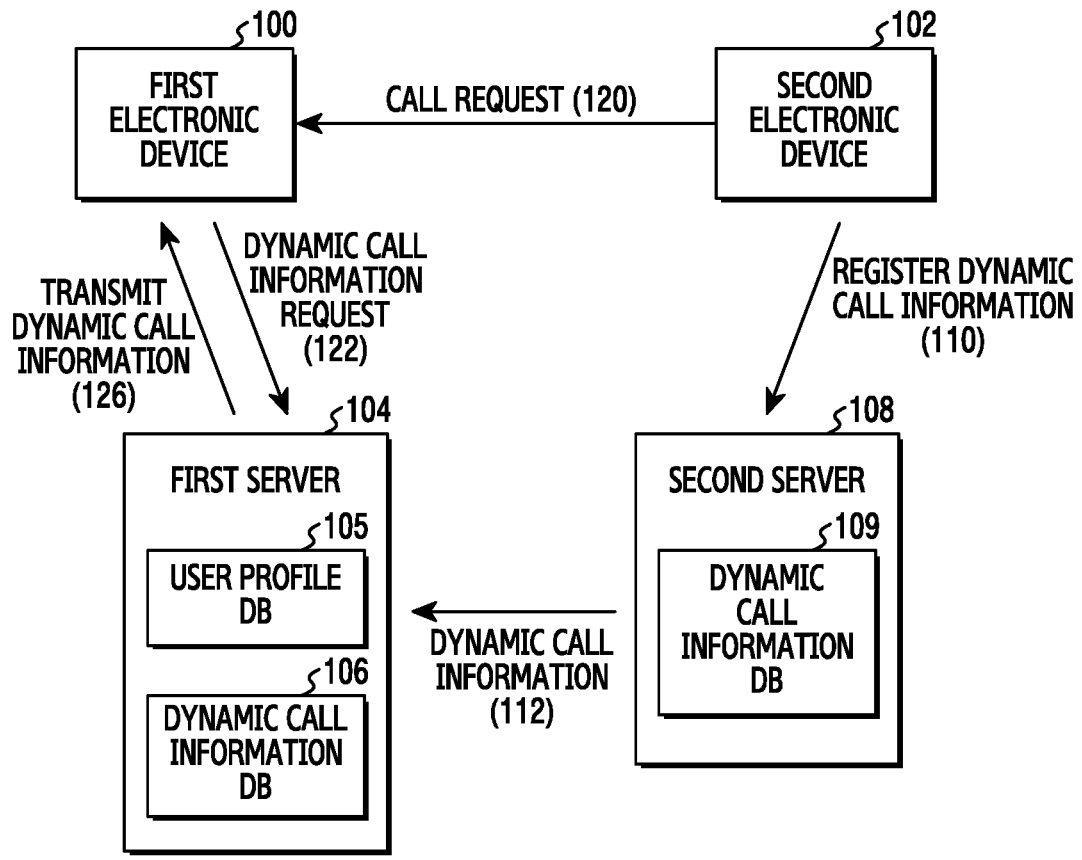
FIG. 1 is a block diagram of a system according to an embodiment.

Hereinafter, embodiments of the present disclosure are described below with reference to the accompanying drawings. It should be understood, however, that it is not intended to limit the embodiments of the present disclosure to the particular form disclosed, but, on the contrary, it is intended to cover all modifications, equivalents, and alternatives falling within the spirit and scope of the present document as defined by the appended claims and their equivalents. Like reference numerals denote like components throughout the drawings. A singular expression includes a plural concept unless there is a contextually distinctive difference therebetween.

In the present disclosure, the expressions "A or B", "A and/or B", and the like may include all possible combinations of items enumerated together. Although expressions such as "$1^{st}$", "$2^{nd}$", "first", and "second" may be used to express corresponding elements, it is not intended to limit the corresponding elements. When a certain (e.g., a $1^{st}$) element is mentioned as being "operatively or communicatively coupled with/to" or "connected to" a different (e.g., a $2^{nd}$) element, the certain element is directly coupled with/to another element or may be coupled with/to the different element via another (e.g., a $3^{rd}$) element.

The expression "configured to" used in the present disclosure may be interchangeably used with, for example, "suitable for", "having the capacity to", "adapted to", "made to", "capable of", and "designed to" in a hardware or software manner according to a situation. In a certain situation, the expression "a device configured to" may imply that the device is "capable of" together with other devices or components. For example, the expression "a processor configured to perform A, B, and C" may imply a dedicated processor (e.g., an embedded processor) for performing a corresponding operation or a general purpose processor (e.g., a central processing unit (CPU) or an application processor (AP)) capable of performing corresponding operations by executing one or more software programs stored in a memory device.

An electronic device according to an embodiment, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), a moving picture experts group audio layer 3 (MP3) player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to an embodiment, the electronic device (e.g. a home appliance) may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV™), a game console (e.g., Xbox® and PlayStation®), an electronic dictionary, an electronic key, a camcorder, and an electronic photo frame.

According to an embodiment, an electronic device may include at least one of various medical devices (e.g., various portable medical measuring devices (a blood glucose monitoring device, a heart rate monitoring device, a blood pressure measuring device, a thermometer, etc.), a magnetic resonance angiography (MRA) machine, a magnetic resonance imaging (MRI) machine, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device, and a gyro-compass), avionics, security devices, an automotive head unit, a robot for home or industry, an automated teller machine (ATM) in banks, point of sales (POS) devices in a shop, or Internet of Things (IoT) devices (e.g., a light bulb, various sensors, an electric or gas meter, a sprinkler device, a fire alarm, a thermostat, a streetlamp, a toaster, sporting goods, a hot water tank, a heater, a boiler, etc.).

According to an embodiment, the electronic device may include at least one of a part of furniture or a building/structure, an electronic board, an electronic signature receiving device, a projector, and various kinds of measuring instruments (e.g., a water meter, an electric meter, a gas meter, and a radio wave meter). An electronic device may be a combination of one or more of the aforementioned devices. An electronic device may be a flexible device. Further, an electronic device is not intended to be limited to the aforementioned devices, but may include a newly developed electronic device.

Hereinafter, an electronic device according to an embodiment is described with reference to the accompanying drawings. As used herein, the term "user" may indicate a person who uses an electronic device or a device (e.g., an artificial intelligence electronic device) that uses an electronic device.

FIG. 1 is a block diagram of a system according to an embodiment.

Referring to FIG. 1, the system may include a first electronic device 100, a second electronic device 102, a first server 104, and a second server 108. While the first server 104 and the second server 108 are described below as separate servers, the first server 104 and the second server 108 may be implemented in an embodiment as a single server.

According to an embodiment, the first electronic device 100 may receive a call connection request signal 120 from the second electronic device 102. When the first electronic device 100 receives the call connection request signal 120 from the second electronic device 102, the first electronic device 100 may transmit, to the first server 104, a signal 122 for requesting dynamic call information of the second electronic device 102. The dynamic call information may include information that must be displayed on a screen according to a call state. The dynamic call information may include information corresponding to at least one of a call connection attempt state, a call-connected state, and a call connection-terminated state. The dynamic call information may include at least one of, for example, outgoing prologue information, incoming prologue information, logo information, epilogue information, a message, a phone number of the second electronic device 102, and a name of the second electronic device 102 (e.g., a user name or a company name), and may include call state information corresponding to each information. For example, the dynamic call information may include information, such as (1) call connection attempt state information such as outgoing prologue information, incoming prologue information, a message, a phone number, and a name (2) call connected-state information such as logo information, a phone number, and a name; and (3) call-terminated state information such as an epilogue, a phone number, and a name. The above-described information included in the dynamic call information are merely examples for description purposes, but the dynamic call information is not intended to be limited thereto. The dynamic call information may include various types of contents. For example, the dynamic call information may an image, text, an animation image, a game, music, a video, a uniform resource locator (URL), weather, haptic data, handwriting, or three dimensional (3D) content. The signal for requesting the dynamic call information of the second electronic device 102 may include a signal for inquiring about whether the second electronic device 102 subscribes to a dynamic call information display service. The first electronic device 100 may transmit, to the first server 104, the signal 122 for requesting the dynamic call information of the second electronic device 102 and/or the signal for inquiring about whether the second electronic device 102 subscribes to the dynamic call information display service, based on identification information (e.g., a phone number) of the second electronic device 102.

According to an embodiment, the first electronic device 100 may receive the dynamic call information 126 of the second electronic device 102 from the first server 104. The first electronic device 100 may identify a call state with the second electronic device 102, and may detect information corresponding to the call state from the received dynamic call information. Based on the call state, the first electronic device 100 may display the information corresponding to the call state. For example, when it is determined that the call state with the second electronic device 102 is a call connection attempt state, the first electronic device 100 may display an incoming call notification screen including at least one of outgoing prologue information, incoming prologue information, a message, a phone number, and a name which correspond to the call connection attempt state from among information included in the dynamic call information. For example, when it is determined that the call state with the second electronic device 102 is a call-connected state, the first electronic device may display a call-connected screen including at least one of logo information, a phone number, and a name which correspond to the call connected-state from among information included in the dynamic call information. For example, when it is determined that the call state with the second electronic device 102 is a call-terminated state, the first electronic device may display a call-terminated notification screen including at least one of an epilogue, a phone number, and a name which correspond to the call-terminated state from among information included in the dynamic call information.

The second electronic device 102 may register dynamic call information 110 in the second server 108. According to an embodiment, when an event for registering dynamic call information is detected, the second electronic device 102 may display a dynamic call information input screen. The second electronic device 102 may receive input of dynamic call information via the dynamic call information input screen, and may transmit the input dynamic call information to the second server 108. The second electronic device 102 may additionally register, in the second server 108, dynamic call information that sets the first electronic device as a target, before requesting a call connection from the first electronic device 100.

The first server 104 may store information associated with an electronic device that subscribes to the dynamic call information display service in a user profile database (DB) 105, and may manage the same. For example, the first server 104 may store and manage information associated with at least one of a phone number, a name, an event, a picture, an e-mail, an organization, or a status message of an electronic device that subscribes to the dynamic call information display service. The first server 104 may obtain dynamic call information 112 associated with an electronic device that subscribes to the dynamic call information display service from the second server 108, and may store the obtained dynamic call information in a dynamic call information DB 106. When the signal for requesting the dynamic call information 122 of the second electronic device 102 is received from the first electronic device 100, the first server 104 may obtain the dynamic call information of the second electronic device 102 from the dynamic call information DB 106 or the second server 108, based on the identification information of the second electronic device 102. The first server 104 may transmit the obtained dynamic call information 126 of the second electronic device 102 to the first electronic device 100. According to an embodiment, the first server 104 may periodically obtain dynamic call information associated with electronic devices that subscribe to the dynamic call information display service from the second server 108, and may cache the same in the dynamic call information DB 106. When the first electronic device 100 requests the dynamic call information of the second electronic device 102, the first server 104 may obtain dynamic call information associated with electronic devices that subscribe to the dynamic call information display service from the second server 108. When the first electronic device 100 requests the dynamic call information of the second electronic device 102, the first server 104 may obtain the dynamic call information of the second electronic device 102 from the second server 108. The first server 104 may be referred to as, for example, an enhanced features (EF) server.

The second server 108 may store dynamic call information received from the second electronic device 102 in a dynamic call information DB 109. According to an embodiment, the second server 108 may provide, to the first server 104, dynamic call information 112 stored in the dynamic call information DB 109 at predetermined intervals. The second server 108 may provide, to the first server 104, dynamic call information 112 associated with at least one electronic device that is stored in the dynamic call information DB 109, in response to a request from the first server 104. The second server 108 may be referred to as, for example, an aggregate server.

The first electronic device 100 may register dynamic call information in the second server 108 in the same manner as the second electronic device 102.

Figure 2:
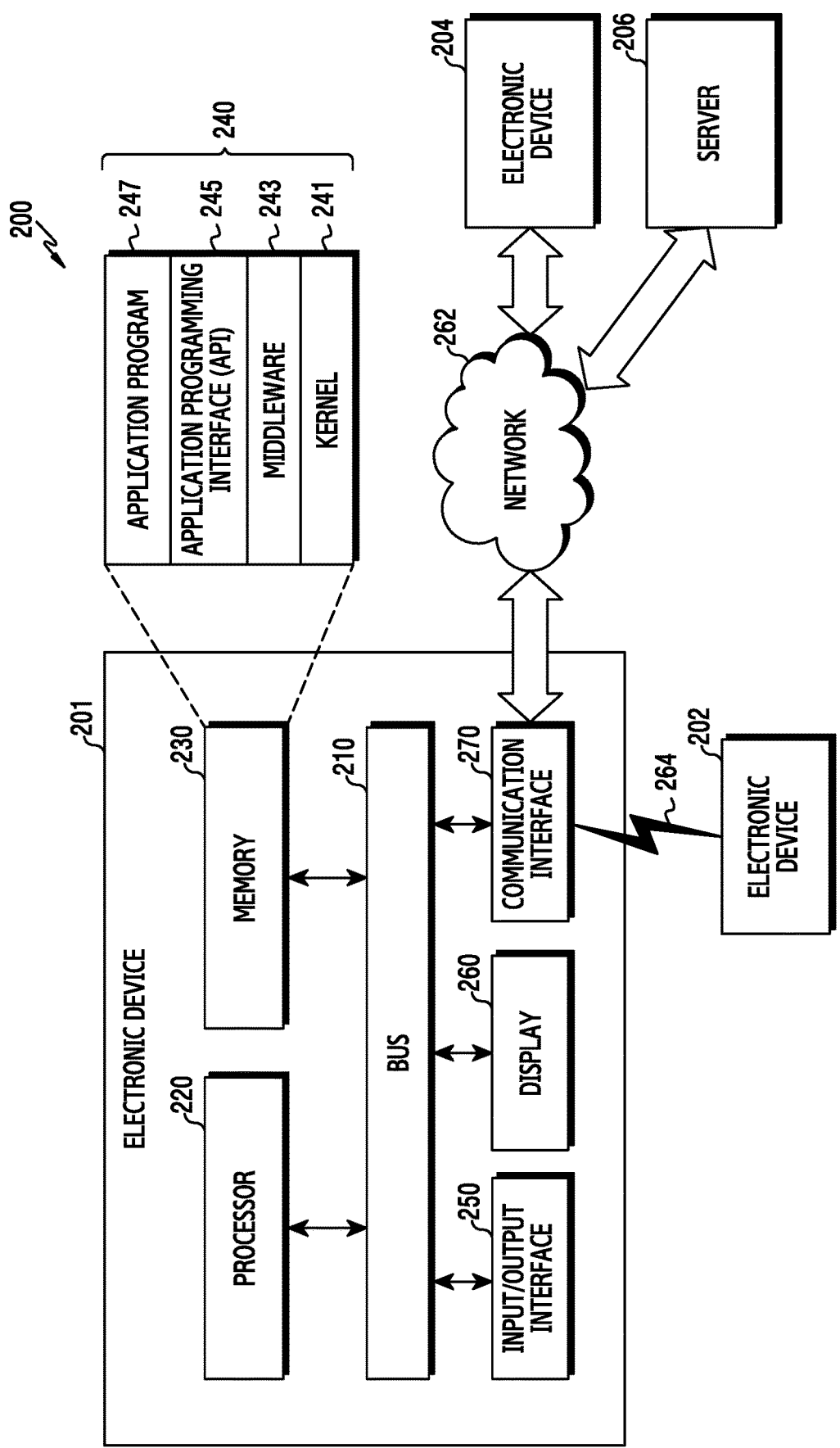
FIG. 2 is a block diagram of an electronic device in a network environment according to an embodiment.

FIG. 2 is a block diagram of an electronic device 201 in a network environment 200 according to an embodiment. The electronic device 201 may be the first electronic device 100 or the second electronic device 102 of FIG. 1.

Referring to FIG. 2, the electronic device 201 may include a bus 210, a processor 220, a memory 230, an input/output interface 250, a display 260, and a communication interface 270. The electronic device 201 may omit at least one of the elements, or may further include other elements.

The bus 210 may include, for example, a circuit which interconnects the elements 220 to 270 and delivers communication (e.g., a control message and/or data) between the elements.

The processor 220 may include one or more of a CPU, an AP, an image signal processor (ISP), and a communication processor (CP). The processor 220, for example, may carry out operations or data processing relating to the control and/or communication of at least one other element of the electronic device 201.

According to an embodiment, the processor 220 may perform a control function for registering dynamic call information in a server 206. The processor 220 may detect, based on a user input, a dynamic call information registration event. The processor 220 may control the display 260 such that a dynamic call information input screen is displayed in response to detecting the dynamic call information registration event. The processor 220 may perform control such that dynamic call information is received based on a user input provided via the dynamic call information input screen, where the received dynamic call information is transmitted to the server 206 by controlling the communication interface 270. The dynamic call information may include information that must be displayed on a screen according to a call state. The dynamic call information may include information as described above with reference to FIG. 1. The dynamic call information may include storage characteristic information associated with dynamic call information for each call state. For example, the dynamic call information may include information indicating that dynamic call information corresponding to a call connection attempt state has a non-volatile characteristic, and dynamic call information corresponding to a call-connected state and dynamic call information corresponding to a call-terminated state have a volatile characteristic.

According to an embodiment, the processor 220 may additionally register, in the server 206, dynamic call information that sets another electronic device to which a call connection request is to be transmitted as a target, before requesting a call connection with the target electronic device (e.g., the electronic device 202 or the electronic device 204). For example, the processor 220 may control a function of additionally registering, in the server 206, dedicated-dynamic call information which is used for a predetermined electronic device, in the state in which common-dynamic call information that is commonly used for a plurality of other electronic devices has been registered in the server. The dedicated-dynamic call information may include identification information of a predetermined electronic device. The dedicated-dynamic call information may include information indicating whether the corresponding information is to be used every time that a call event with the corresponding electronic device occurs, or whether the corresponding information is to be used for just one call with the corresponding electronic device. For example, the dedicated-dynamic call information may include characteristic information indicating whether the corresponding information is single-use information. The dedicated-dynamic call information may include information indicating a storage characteristic of the corresponding information. For example, the dedicated-dynamic call information may include information indicating whether the corresponding information is non-volatile information or volatile information.

According to an embodiment, the processor 220 may perform a control function for detecting an occurrence of a call event, and for obtaining dynamic call information associated with a call partner electronic device (e.g., the electronic device 202 or the electronic device 204). The processor 220 may detect, based on a user input, that an outgoing call event occurs, or may detect, based on a received signal, that an incoming call event occurs. The processor 220 may identify the identification information (e.g., a phone number) of a partner electronic device, based on a received signal or a user input. The processor 220 may obtain dynamic call information of the partner electronic device from the server 206, based on the identification information of the partner electronic device. For example, the processor 220 may control the communication interface 270 such that a dynamic call information request signal including identification information of the partner electronic device or a dynamic call information display service subscription inquiry signal including identification information of the partner electronic device is transmitted to the server 106, and may receive the dynamic call information of the partner electronic device from the server 206 via the communication interface 270 in response to the transmitted signal. The processor 220 may obtain dynamic call information of the partner electronic device from the memory 230, based on the identification information of the partner electronic device. For example, the processor 220 may detect dynamic call information corresponding to the identification information of the partner electronic device from a contact information database. The obtained dynamic call information may include common-dynamic call information corresponding to at least one call state and dedicated-dynamic call information corresponding to at least one call state. For example, the dynamic call information may include at least one of common-dynamic call information corresponding to a call connection attempt state, common-dynamic call information corresponding to a call connected-state, common-dynamic call information corresponding to a call-terminated state, dedicated-dynamic call information corresponding to a call connection attempt state, dedicated-dynamic call information corresponding to a call-connected state, and dedicated-dynamic call information corresponding to a call-terminated state.

According to an embodiment, the processor 220 may identify a call state with the partner electronic device, and may control the display 260 such that dynamic call information corresponding to the identified call state is displayed on the screen. The processor 220 may identify the call state with the partner electronic device using a phone application. For example, when the call state with the partner electronic device corresponds to a call connection attempt state, the processor 220 may control the display 260 such that the dynamic call information corresponding to the call connection attempt state is displayed on the screen. For example, when the call state with the partner electronic device corresponds to a call-connected state, the processor 220 may control the display 260 such that the dynamic call information corresponding to the call-connected state is displayed on the screen. For example, when the call state with the partner electronic device corresponds to a call-terminated state, the processor 220 may control the display 260 such that the dynamic call information corresponding to the call-terminated state is displayed on the screen. When common-dynamic call information and dedicated-dynamic call information corresponding to the determined call state exist, the processor 220 may perform control such that the dedicated-dynamic call information is displayed on the screen. When common-dynamic call information and dedicated-dynamic call information corresponding to the determined call state exist, the processor 220 may perform control such that the common-dynamic call information and the dedicated-dynamic call information are displayed together on the screen. When only common-dynamic call information corresponding to the determined call state exists, the processor 220 may perform control such that the common-dynamic call information is displayed on the screen. When a URL is included in the dynamic call information corresponding to the determined call state, the processor 220 may control the display 260 such that a website screen corresponding to the URL is displayed. When a URL is included in the dynamic call information corresponding to the determined call state, the processor 220 may detect whether a user input for the dynamic call information displayed on the screen occurs. When the user input for the dynamic call information displayed on the screen is detected, the processor 220 may control the display 260 such that the website screen corresponding to the URL is displayed. For example, in response to detecting the user input for the dynamic call information displayed on the screen, the processor 220 may execute a web view or a web browser application, and may control the display 260 such that the website screen corresponding to the URL is displayed via the executed application. The website screen may occupy the entirety or a part of the screen of the electronic device 201. The occupied area of the website screen may be set to be different for each call state. For example, when the call state with the partner electronic device is a call-connected state, the processor 220 may perform control such that the website screen occupies a part of the screen. For example, when the call state with the partner electronic device is the call-connected state, the processor 220 may perform control such that the website screen is displayed on a part of the screen in the state in which at least one piece of dynamic call information corresponding to the call-connected state is displayed. When the call state with the partner electronic device is a call-terminated state, the processor 220 may perform control such that the website screen occupies the entirety of the screen. The occupied area of the website screen may be set and changed by a designer and a user.

According to an embodiment, when the processor 220 fails to obtain the dynamic call information of the partner electronic device, the processor 220 may perform control such that basic information is displayed on the display 260. The basic information may include at least one of, for example, identification information of the partner electronic device and user profile information of the partner electronic device which is stored in the contact database. When a signal indicating that the partner electronic device does not subscribe to a dynamic call information display service or a signal indicating that the partner electronic device does not register the dynamic call information is received from the server 206, the processor 220 may determine that obtaining the dynamic call information fails. When obtaining the dynamic call information of the partner electronic device fails, the processor 220 may determine whether user profile information corresponding to the identification information of the partner electronic device exists in the contact information database. When the user profile information corresponding to the identification information of the partner electronic device exists in the contact information database, the processor 220 may control a function of displaying a call connection attempt state screen, a call-connected state screen, and a call-terminated state screen, based on at least one piece of information included in the corresponding user profile information (e.g., a phone number, a name, a profile image, or the like). For example, the call connection attempt state screen, the call-connected state screen, and the call-terminated state screen may include at least one of the phone number, the name, and the profile image of the partner electronic device. When the user profile information corresponding to the identification information of the partner electronic device does not exist in the contact information database, the processor 220 may control a function of displaying the call connection attempt state screen, the call-connected state screen, and the call-terminated state screen, based on the identification information of the partner electronic device. For example, the call connection attempt state screen, the call-connected state screen, and the call-terminated state screen may include the phone number of the partner electronic device.

According to an embodiment, the processor 220 may control a function of transmitting a push message based on a user input during a call-connected state with the partner electronic device. For example, the processor 220 may detect, based on a user input, a push message writing event during the state in which a call is connected with the partner electronic device, and may control the display 260 such that a screen including a user interface for writing a push message is displayed. The processor 220 may detect, based on a user input, a push message writing completion and push message transmission event. In response to detecting the push message transmission event, the processor 220 may control the communication interface 270 such that the push message is transmitted to the partner electronic device.

According to an embodiment, the processor 220 may receive the push message from the partner electronic device via the communication interface 270 in the state of being on a call connected with the partner electronic device. According to an embodiment, the processor 220 may perform control such that the push message received during a call-connected state with the partner electronic device is displayed on the display 260. For example, the processor 220 may control the display 260 such that dynamic call information corresponding to the call-connected state is displayed on the screen, and the push message is displayed on a predetermined area of the screen. The predetermined area where the push message is displayed may be the entirety or a part of the screen, and may be set and changed by a designer and/or a user. The processor 220 may control the display 260 such that a popup window including the push message is displayed. When a URL is included in the push message, the processor 220 may control the display 260 such that a website screen corresponding to the URL is displayed. For example, the processor 220 may execute a web view or a web browser application, and may control the display 260 such that the website screen corresponding to the URL is displayed via the executed application.

According to an embodiment, the processor 220 may store the dynamic call information of the partner electronic device. For example, the processor 220 may store the entirety or a part of the dynamic call information of the partner electronic device in the memory 230. The processor 220 may determine whether to store dynamic call information corresponding to at least one call state, based on the storage characteristic of the dynamic call information. For example, after the termination of the call with the partner electronic device, the processor 220 may store dynamic call information, the storage characteristic of which is set to a non-volatile characteristic, in the memory 230, and may discard dynamic call information, the storage characteristic of which is set to a volatile characteristic. For example, the processor 220 may store, in the memory 230, common-dynamic call state information of a predetermined call state, the storage characteristic of which is set to the non-volatile characteristic. The processor 220 may determine whether to store dedicated-dynamic call information, based on at least one of the storage characteristic and the usage characteristic of the dedicated-dynamic call information. For example, when the usage characteristic of the dedicated-dynamic call information is not single-use, the processor 220 may store the dedicated-dynamic call information in the memory 230. When the usage characteristic of the dedicated-dynamic call information is set to single-use, the processor 220 may not store the dedicated-dynamic call information in the memory 230 and discard the same after the termination of the call with the partner electronic device. For example, when the storage characteristic of the dedicated-dynamic call information is set to the non-volatile characteristic, the processor 220 may store the dedicated-dynamic call information in the memory 230. When the storage characteristic of the dedicated-dynamic call information is set to volatile characteristic, the processor 220 may not store the dedicated-dynamic call information in the memory 230 and discard the same after the termination of the call with the partner electronic device.

The processor 220 may selectively store, based on user settings, the dynamic call information in the memory 230. For example, the processor 220 may set a kind (or type) of dynamic call information to be stored based on a user input, and may store dynamic call information corresponding to the set type in the memory 230. The type of dynamic call information may be distinguished based on a call state, and may be distinguished based on whether the dynamic call information is for common-use or for dedicated-use. For example, based on a user input, the processor 220 may perform setting based on a user input such that dynamic call information corresponding to a call connection attempt state is stored in the memory 230 from among common-dynamic call information. The processor 220 may store, in the memory 230, common-dynamic call information corresponding to the call connection attempt state after the call is terminated. For example, the processor 220 may perform setting based on a user input such that dynamic call information corresponding to a call-connected state from among dedicated-dynamic call information. The processor 220 may store, in the memory 230, dedicated-dynamic call information corresponding to the call-connected state after the call is terminated. The type of dynamic call information may be distinguished based on a content type. For example, the processor 220 may perform setting based on a user input such that an image is stored from among dynamic call information. The processor 220 may select image data from the dynamic call information after the call is terminated, and may store the selected image data in the memory 230. For example, the processor 220 may perform setting based on a user input such that a URL from among dynamic call information is stored. The processor 220 may store the URL data stored in the dynamic call information in the memory 230 after the call is terminated.

According to an embodiment, when contact information (or user profile information) associated with at least one other electronic device is updated, the processor 220 may control a function of synchronizing the updated contact information with the server 206. For example, the processor 220 may detect, based on a user input, that user profile information (e.g., a phone number, a name, a profile image, an e-mail address, or the like) associated with at least one other electronic device which is stored in the contact information database is updated (e.g., added, changed, and/or deleted), and may control the communication interface 270 to transmit, to the server 206, a signal indicating that contact information associated with the at least one other electronic device has been updated. In response to the transmission of the signal indicating that the contact information has been updated, the processor 220 may receive, from the server 206, a contact information update response signal indicating that update of the contact information is reflected to the server 206. The contact information update response signal may include information indicating whether a partner electronic device corresponding to the updated contact information subscribes to a dynamic call information display service. For example, when contact information associated with the electronic device 204 is added, the processor 220 may control the communication interface 270 to transmit, to the server 206, a signal indicating that contact information associated with the electronic device 204 has been added. The processor 220 may receive a contact information update response signal indicating that updated contact information associated with the electronic device 204 is reflected to the server 206, and the electronic device 204 subscribes to the dynamic call information display service, from the server 206 via the communication interface 270. The processor 220 may record whether the partner electronic device subscribes to the dynamic call information display service in the contact information database of the memory 230, based on a contact information update response signal.

According to an embodiment, the processor 220 may delete dynamic call information associated with at least one partner electronic device which is stored in the contact information database. For example, the processor 220 may delete the dynamic call information associated with the partner electronic device, based on at least one of the number of times that a call event with the partner electronic device occurs, the frequency of a call event, the number of times that a call is connected, and the frequency of a call connection. For example, when the number of times that a call event with the partner electronic device occurs during a predetermined period of time is less than a threshold number, the processor 220 may delete the dynamic call information of the partner electronic device.

The memory 230 may include a volatile and/or non-volatile memory. The memory 230 may store, for example, command or data relevant to at least one other element of the electronic device 201. According to an embodiment, the memory 230 may store software and/or a program 240. For example, The program 240 may include, for example, a kernel 241, middleware 243, an application programming interface (API) 245, or an application program (or applications) 247. At least some of the kernel 241, the middleware 243, and the API 245 may be referred to as an operating system (OS). The memory 230 may store biometric information for user authentication. The memory 230 may store user profile information associated with at least one other electronic device (e.g., the electronic device 202 and the electronic device 204) in the contact information database. The user profile information may include at least one of, for example, a phone number of an electronic device, a name, an event, a profile image, an address, an e-mail address, a web address, an organization, a group, a relationship with the electronic device 201, a nickname, and a status message. The memory 230 may store dynamic call information associated with at least one electronic device according to control of the processor 220.

The kernel 241 may control or manage system resources (e.g., the bus 210, the processor 220, or the memory 230) used for executing an operation or function implemented by other programs (e.g., the middleware 243, the API 245, or the application program 247). Furthermore, the kernel 241 may provide an interface by which the middleware 243, the API 245, or the application program 247 may access the individual elements of the electronic device 201 to control or manage the system resources.

The middleware 243 may function as, for example, an intermediary for allowing the API 245 or the application program 247 to communicate with the kernel 241 to exchange data. The middleware 243 may process one or more task requests received from the application program 247 according to the priorities thereof. For example, the middleware 243 may assign priorities to use the system resources (e.g., the bus 210, the processor 220, the memory 230, or the like) of the electronic device 201 to one or more of the application program 247, and may process the one or more task requests. The API 245 is an interface used by the application program 247 to control a function provided from the kernel 241 or the middleware 243, and may include, for example, at least one interface or function (e.g., an instruction) for file control, window control, image processing, a character control, and the like.

The input/output interface 250 may function as, for example, an interface that can forward commands or data, which are input from a user or an external device, to the other element(s) of the electronic device 201. The input/output interface 250 may output commands or data received from the other element(s) of the electronic device 201 to a user or the external device. The input/output interface 250 may include a key pad, a dome switch, a physical button, a touch panel, and a jog and shuttle control. The input/output interface 250 may be at least one sensor device that may receive sensor data associated with, for example, biometric information, a movement, a temperature, a sound, an image, and the like.

The display 260 may include, for example, a liquid crystal display (LCD), a light emitting diode (LED) display, an organic LED (OLED) display, a micro electro mechanical system (MEMS) display, or an electronic paper display. The display 260 may display, for example, various types of content (e.g., text, images, videos, icons, and/or symbols) for a user. The display 260 may include a touch screen and may receive, for example, a touch input, a gesture input, a proximity input, or a hovering input using an electronic pen or a part of the user's body. The display 260 may display dynamic call information based on a call state, according to control of the processor 220.

The communication interface 270 may establish communication between the electronic device 201 and the electronic device 202, the electronic device 204, or the server 206. For example, the communication interface 270 may be connected to the network 262 via wireless or wired communication to communicate with the electronic device 204 or the server 206. The communication interface 270 may transmit and receive a signal for communicating with the electronic device 204 or the electronic device 206. The communication interface 270 may transmit and receive a signal for obtaining dynamic call information from the server 206 according to control of the processor 220.

Wireless communication may include, for example, a cellular communication that uses at least one of long term evolution (LTE), LTE-advance (LTE-A), code division multiple access (CDMA), wideband CDMA (WCDMA), universal mobile telecommunication system (UMTS), wireless broadband (WiBro), global system for mobile communications (GSM), a fifth generation (5G) network, and the like. According to an embodiment, wireless communication may include, for example, at least one (e.g., a short-range communication) of wireless fidelity (WiFi), light fidelity (Li-Fi), Bluetooth, Bluetooth low energy (BLE), Zigbee, near field communication (NFC), magnetic secure transmission (MST), radio frequency (RF), and body area network (BAN). Wireless communication may include a global navigation satellite system (GNSS). The GNSS may be, for example, a global positioning system (GPS), a global navigation satellite system (Glonass), a Beidou Navigation Satellite System (Beidou), or the European global satellite-based navigation system (Galileo). In the present disclosure, the term "GPS" may be used interchangeable with the term "GNSS". Wired communication may include, for example, at least one of a universal serial bus (USB), a high definition multimedia interface (HDMI), recommended standard 232 (RS-232), power line communication, optical communication, and a plain old telephone service (POTS). The network 262 may include a telecommunications network, for example, at least one of a computer network (e.g., a local area network (LAN) or a wide area network (WAN)), the Internet, and a telephone network.

Figure 3:
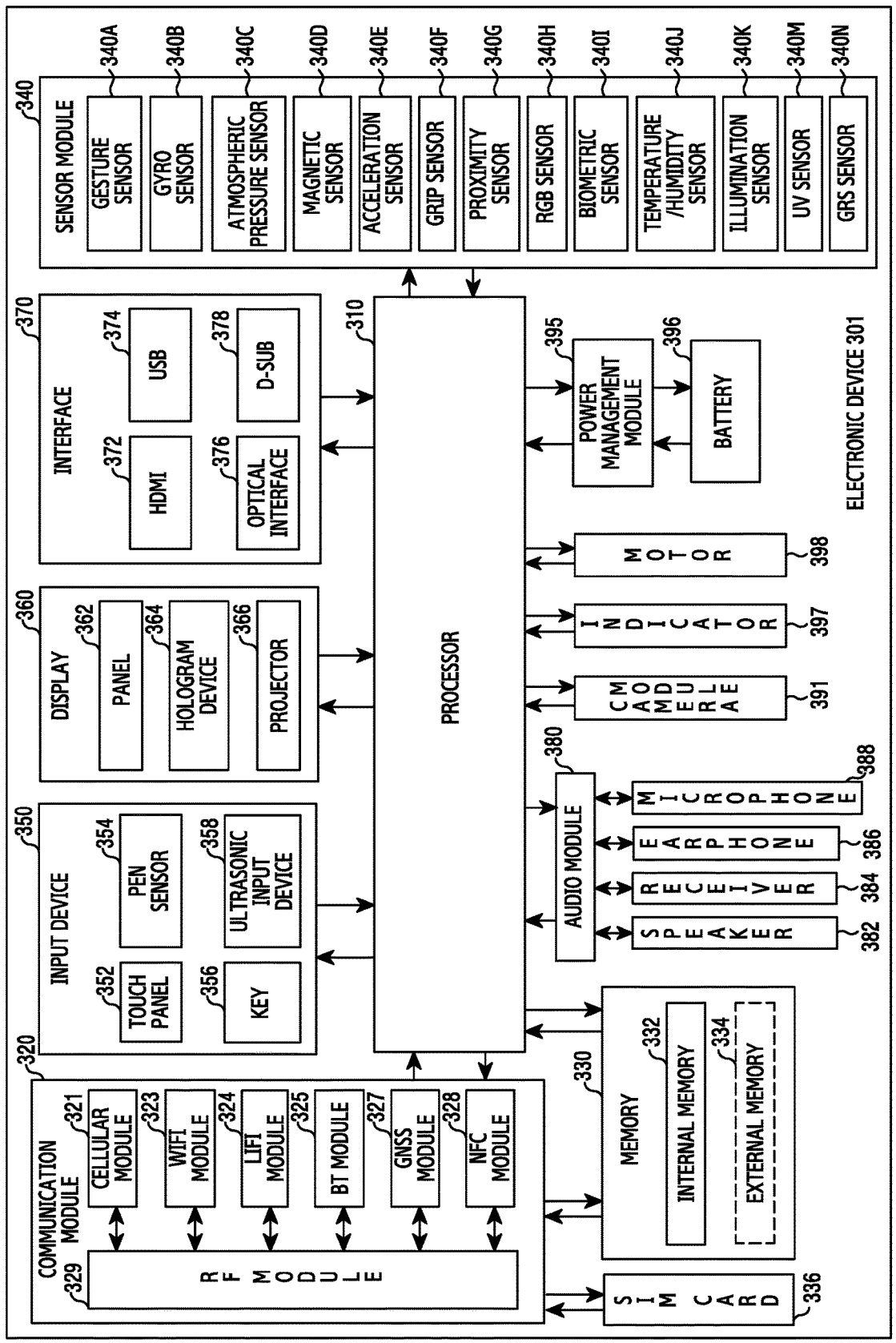
FIG. 3 is a block diagram of an electronic device according to an embodiment.

FIG. 3 is a block diagram of an electronic device 301 according to an embodiment. The electronic device 301 may include, for example, a part or the entirety of the electronic device 201 illustrated in FIG. 2.

Referring to FIG. 3, the electronic device 301 may include at least one processor (e.g., an AP) 310, a communication module 320, a subscriber identification module 336, a memory 330, a sensor module 340, an input device 350, a display 360, an interface 370, an audio module 380, a camera module 391, a power management module 395, a battery 396, an indicator 397, and a motor 398.

The processor 310 may control a plurality of hardware or software elements connected thereto and may perform various data processing and operations by driving an operating system or an application program. The processor 310 may be implemented as, for example, a system on chip (SoC). According to an embodiment, the processor 310 may further include a graphics processing unit (GPU) and/or an ISP. The processor 310 may also include at least some of the elements illustrated in FIG. 3 (e.g., a cellular module 321). The processor 310 may load, in a volatile memory, commands or data received from at least one of the other elements (e.g., a non-volatile memory), process the loaded commands or data, and store the result data in the non-volatile memory.

According to an embodiment, the processor 310 may identify a call state with another electronic device, and may control a function of displaying dynamic call information corresponding to the call state on a screen.

The communication module 320 may have a configuration the same as or similar to that of the communication interface 270 in FIG. 2. The communication module 320 may include, for example, the cellular module 321, a WiFi module 323, an LiFi module 324, a Bluetooth module 325, a GNSS module 327 (for example, a GPS module, a Glonass module, a Beidou module, or a Galileo module), an NFC module 328, and an RF module 329.

The cellular module 321 may provide, for example, a voice call, a video call, a text message service, an Internet service, etc. through a communication network. According to an embodiment, the cellular module 321 may identify and authenticate the electronic device 301 within a communication network using the subscriber identification module 336 (for example, a SIM card). The cellular module 221 may perform at least some of the functions that the processor 310 may provide. The cellular module 321 may include a CP.

The WiFi module 323, the BT module 325, the GNSS module 327, or the NFC module 328 may include, for example, a processor for processing data that is transmitted and received through the corresponding module. According to an embodiment, at least some (e.g., two or more) of the cellular module 321, the WiFi module 323, the LiFi module 324, the Bluetooth module 325, the GNSS module 327, and the NFC module 328 may be included in one integrated circuit (IC) or IC package.

The RF module 329 may transmit and receive, for example, a communication signal (for example, an RF signal). The RF module 329 may include, for example, a transceiver, a power amplifier (amp) module (PAM), a frequency filter, a low noise amplifier (LNA), an antenna, and the like. According to an embodiment, at least one of the cellular module 321, the WiFi module 323, the Bluetooth module 325, the GNSS module 327, and the NFC module 328 may transmit and receive an RF signal through a separate RF module.

The SIM card 336 may include, for example, an embedded SIM and may include unique identification information (for example, an integrated circuit card identifier (ICCID)) or subscriber information (for example, an international mobile subscriber identity (IMSI)).

The memory 330 may include, for example, an internal memory 332 or an external memory 334. The internal memory 332 may include, for example, at least one of a volatile memory (for example, a dynamic random-access memory (DRAM), a static RAM (SRAM), a synchronous dynamic RAM (SDRAM), and the like) and a nonvolatile memory (for example, a one-time programmable read-only memory (OTPROM), a programmable ROM (PROM), an erasable and programmable ROM (EPROM), an electrically erasable programmable ROM (EEPROM), a mask ROM, a flash ROM, a flash memory (for example, a NAND flash, a NOR flash, and the like), a hard drive, or a solid state drive (SSD)).

The external memory 334 may further include a flash drive, for example, a compact flash (CF) drive, a secure digital (SD) card, a micro secure digital (micro-SD) card, a mini secure digital (mini-SD) card, an extreme digital (xD) card, a multimedia card (MMC), a memory stick, and the like. The external memory 334 may be functionally and/or physically connected to the electronic device 301 through various interfaces.

The sensor module 340 may measure, for example, physical quantities or detect an operational state of the electronic device 301 and convert measured or detected information into an electrical signal. The sensor module 340 may include, for example, at least one of a gesture sensor 340A, a gyro sensor 340B, an atmospheric pressure sensor 340C (e.g., a barometric pressure sensor), a magnetic sensor 340D, an acceleration sensor 340E (e.g., an accelerometer), a grip sensor 340F, a proximity sensor 340G, a color sensor 340H (for example, a red, green, and blue (RGB) sensor), a biometric sensor 340I, a temperature/humidity sensor 340J, a illumination sensor 340K, an ultraviolet (UV) light sensor 340M, and a galvanic skin reflex (GRS) sensor 340N. Additionally or alternatively, the sensor module 340 may include, for example, an electronic nose (E-nose) sensor, an electromyography (EMG) sensor, an electroencephalogram (EEG) sensor, an electrocardiogram (ECG) sensor, an infrared (IR) sensor, an iris sensor, a force touch sensor, an ultrasonic sensor, and/or a fingerprint sensor. The sensor module 340 may further include a control circuit to control at least one or more sensors belonging thereto. In an embodiment, the electronic device 301 may further include a processor configured, as a part of the processor 310 or separately from the processor 310, to control the sensor module 340, thereby controlling the sensor module 340 while the processor 310 is in a reduced power or sleep state.

The input device 350 may include, for example, a touch panel 352, a (digital) pen sensor 354, a key 356, or an ultrasonic input device 358. The touch panel 352 may use, for example, at least one of an electrostatic type panel, a pressure-sensitive type panel, an infrared type panel, and an ultrasonic type panel. Further, the touch panel 352 may further include a control circuit. The touch panel 352 may further include a tactile layer to provide a user with a tactile response.

The (digital) pen sensor 354 may, for example, be part of the touch panel 352 or include a separate recognition sheet. The key 356 may include, for example, a physical button, an optical key, or a keypad. The ultrasonic input device 358 may detect ultrasonic waves generated in an input tool through a microphone 388 and identify data corresponding to the detected ultrasonic waves.

The display 360 may include a panel 362, a hologram device 364, a projector 366, and/or a control circuit for controlling the same. The panel 362 may, for example, be implemented to be flexible, transparent, or wearable. The panel 362 may be constructed as one or more modules together with the touch panel 352. According to an embodiment, the panel 362 may include a pressure sensor (or a force sensor) capable of measuring pressure information (e.g., a pressure coordinate and a pressure strength) about a user's touch. The pressure sensor may be implemented in an integrated type with the touch panel 352, or be implemented as one or more sensors separate from the touch panel 352. The hologram device 364 may use the interference of light to show a three-dimensional image in the air. The projector 366 may project light onto a screen to display an image. The screen may, for example, be located inside or outside the electronic device 301. The interface 370 may, for example, include an HDMI 372, a USB 374, an optical interface 376, or a D-subminiature (D-sub) connector 378. The optical interface 376 may, for example, be included in the communication interface 270 illustrated in FIG. 2. Additionally or alternatively, the optical interface 370 may, for example, include a mobile high-definition link (MHL) interface, an SD card/MMC interface, or an Infrared Data Association (IrDA) standard interface.

The audio module 380 may convert, for example, a sound and an electrical signal reciprocally. At least some components of the audio module 280 may be included, for example, in the input/output interface 250 illustrated in FIG. 2. The audio module 380 may process sound information input or output, for example, through a speaker 382, a receiver 384, an earphone 386, or the microphone 388.

The camera module 391 is a device that takes, for example, a still image and a video. According to an embodiment, the camera module 391 may include one or more image sensors (for example, a front sensor or a rear sensor), a lens, an ISP, or a flash (for example, an LED, a xenon lamp, or the like).

The power management module 395 may manage, for example, the power of the electronic device 301. According to an embodiment, the power management module 395 may include a power management integrated circuit (PMIC), a charger integrated circuit (IC), or a battery gauge. The power management module 395 may be supplied with power from the outside via a cable and/or wirelessly. For example, the power management module 395 may be supplied with power from the outside using a wireless charging method, such as a magnetic resonance method, a magnetic induction method, or an electromagnetic wave method. The power management module 395 may further include an additional circuit, such as a coil loop, a resonance circuit, or a rectifier, to be supplied with power wirelessly. The battery gauge may measure, for example, the remaining battery charge, the charging voltage, the current, or temperature of the battery 396.

The battery 396 may include, for example, a rechargeable battery and/or a solar battery. According to an embodiment, the battery 396 may include a plurality of cells connectable in series or in parallel.

The indicator 397 may display a certain state of the electronic device 301 or a component thereof (for example, the processor 310), for example, a booting state, a message state, or a charging state. The motor 398 may convert an electrical signal into mechanical vibrations and may generate vibrations or a haptic effect. The electronic device 301 may include a processing device for supporting a mobile TV (for example, a GPU). The processing device for supporting the mobile TV may process media data in accordance with digital multimedia broadcasting (DMB), digital video broadcasting (DVB), or mediaFlo™ standards.

Each of the above-described component elements of hardware according to the present disclosure may be configured with one or more components, and the names of the corresponding component elements may vary based on the type of electronic device. The electronic device according to an embodiment may include at least one of the aforementioned elements. Some elements may be omitted or other additional elements may be further included in the electronic device. Also, some of the hardware components may be combined into one entity, which may perform functions identical to those of the relevant components before the combination.

Figure 4:
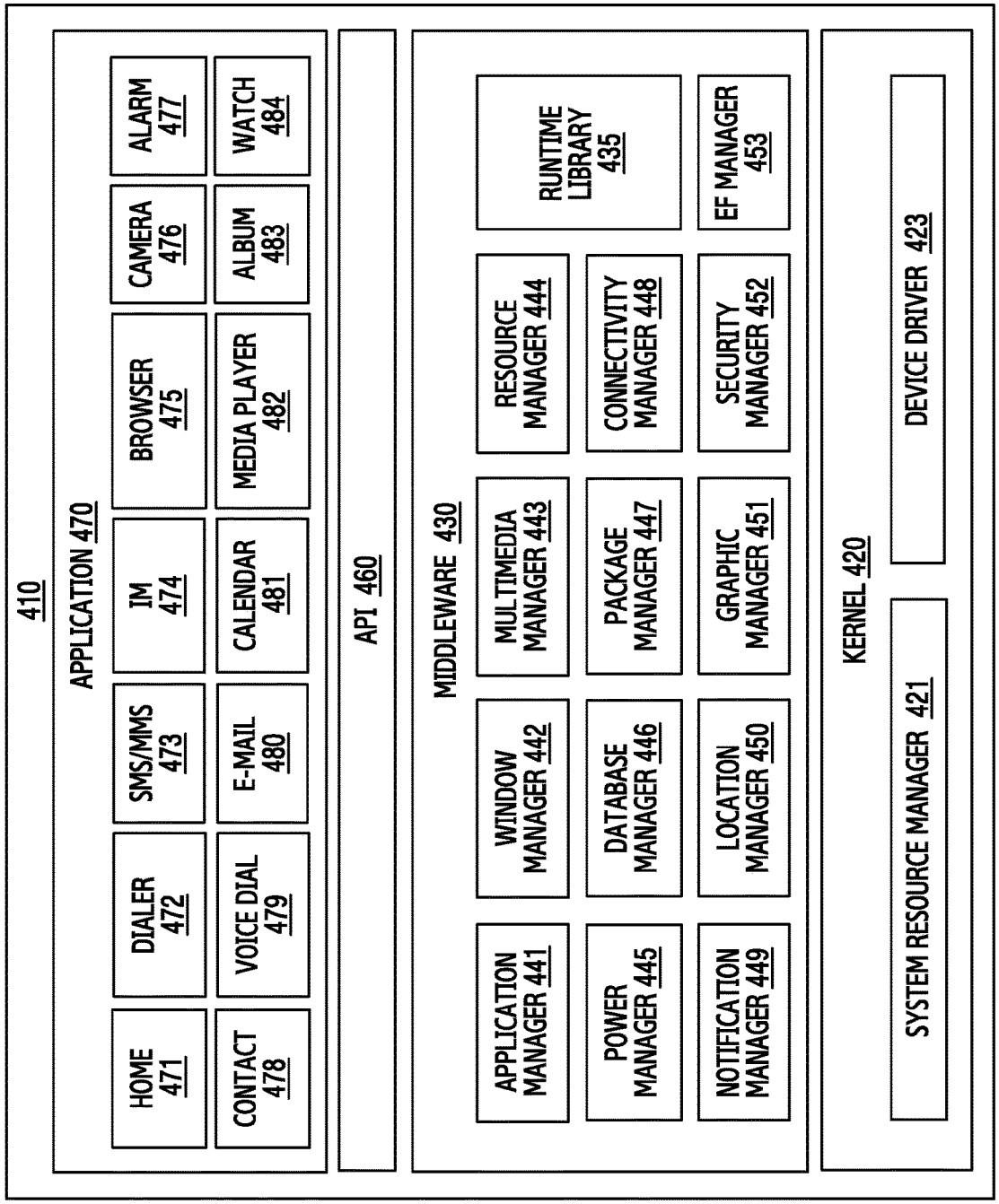
FIG. 4 is a block diagram of a program module according to an embodiment.

FIG. 4 is a block diagram of a program module 410 according to an embodiment. The program module 410 (e.g., the program 240) may include an operating system that controls resources relating to an electronic device 201 and/or various applications 247 that are driven on the operating system. The operating system may include, for example, Android®, iOS®, Windows®, Symbian®, Tizen®, or Bada™.

Referring to FIG. 4, the program module 410 may include a kernel 420, middleware 430, an API 460, and/or an application 470. At least a part of the program module 410 may be preloaded on the electronic device, or may be downloaded from the electronic device 202, the electronic device 204, or the server 206.

The kernel 420 may include, for example, a system resource manager 421 and/or a device driver 423. The system resource manager 421 may control, allocate, or retrieve system resources. According to an embodiment, the system resource manager 421 may include a process manager, a memory manager, or a file system manager. The device driver 423 may include, for example, a display driver, a camera driver, a Bluetooth driver, a shared memory driver, a USB driver, a keypad driver, a WiFi driver, an audio driver, a touch device driver, a pressure device driver, or an inter-process communication (IPC) driver.

The middleware 430 may provide, for example, a function required by the application 470 in common, or may provide various functions to the application 470 via the API 460 such that the application 470 may use limited system resources within the electronic device. The middleware 430 may include at least one of a runtime library 435; an application manager 441; a window manager 442; a multi-media manager 443; a resource manager 444; a power manager 445; a database manager 446; a package manager 447; a connectivity manager 448; a notification manager 449; a location manager 450; a graphic manager 451; a security manager 452; and an enhanced feature (EF) manager 453.

The runtime library 435 may include, for example, a library module that a compiler uses in order to add a new function via a programming language while the application 470 is being executed. The runtime library 435 may manage an input/output, manage a memory, or process an arithmetic function.

The application manager 441 may manage, for example, the life cycles of the application 470. According to an embodiment, the application manager 441 may transmit a biometric information request signal to the security manager 452, based on a content request from the application 470. The application manager 441 may provide, to the application 470, content information provided from the database manager 446.

The window manager 442 may manage graphical user interface (GUI) resources used for a screen. The multimedia manager 443 may recognize formats required for reproducing various media files and may encode or decode a media file using a codec suitable for a corresponding format. The resource manager 444 may manage the source code of the application 470 or the space in memory.

The power manager 445 may manage, for example, the capacity or power of a battery and may provide power information required for operating the electronic device. According to an embodiment, the power manager 445 may interoperate with a basic input/output system (BIOS). The database manager 446 may, for example, generate, search, or change databases to be used by the application 470. The database manager 446 may search a database, and detect content that matches biometric information provided from the security manager 452. The package manager 447 may manage the installation or update of an application that is distributed in the form of a package file. The connectivity manager 448 may manage, for example, a wireless connection. The notification manager 449 may provide an event (e.g., an arrival message, an appointment, a proximity notification, and the like) to a user. The location manager 450 may manage, for example, the location information of the electronic device. The graphic manager 451 may manage a graphic effect to be provided to a user or a user interface relating to the graphic effect. The security manager 452 may provide, for example, system security or user authentication. The security manager 452 may collect biometric information via the biometric sensor 180 in response to a biometric information request signal provided from the application manager 441.

The EF manager 453 may manage and control communication with a server that stores and manages dynamic call information. The EF manager 453 may control a function of obtaining dynamic call information of a partner electronic device from a server in response to a request from a phone application. The EF manager 453 may control a function of providing, to the phone application, the dynamic call information obtained from the server. The EF manager 453 may be referred to as, for example, an EF agent.

According to an embodiment, the middleware 430 may include a telephony manager for managing a voice or video call function of the electronic device or a middleware module capable of forming a combination of the functions of the above-described elements. The middleware 430 may provide a module specialized for each type of operation system. The middleware 430 may dynamically remove some of the existing elements, or may add new elements. The API 460 is, for example, a set of API programming functions, and may be provided with different configurations depending on the operating system. For example, in the case of Android® or iOS®, one API set may be provided for each platform, and in the case of Tizen®, two or more API sets may be provided for each platform.

The application 470 may include, for example, a home application 471, a dialer application 472, an SMS/MMS application 473, an instant messaging (IM) application 474, a browser application 475, a camera application 476, an alarm application 477, a contacts application 478, a voice dialing application 479, an e-mail application 480, a calendar application 481, a media player application 482, an album application 483, a watch application 484, a calling application, and a health-care application (e.g., for measuring an exercise quantity or a blood glucose level), environmental information (e.g., atmospheric pressure, humidity, or temperature information) provision applications, and the like. According to an embodiment, the application 470 may include an information exchange application that may support an exchange of information between an electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may install, delete, or update functions of an external electronic device that communicates with the electronic device (e.g., turning on/off the external electronic device (or some elements thereof) or adjusting the brightness (or resolution) of a display) or applications executed in the external electronic device. The application 470 may include applications (e.g., a health care application of a mobile medical appliance) that are designated according to the attributes of an external electronic device. The application 470 may include applications received from an external electronic device. The application 470 may include an application for providing a user authentication service. An application for providing a user authentication service may include applications that need to perform user authentication to execute a function requested by a user, for example, an application for providing a lock function, an application for providing a payment function, and the like. At least a part of the program module 410 may be implemented (e.g., executed) by software, firmware, hardware (e.g., the processor 210), or a combination of two or more thereof, and may include a module, a program, a routine, an instruction set, or a process for performing one or more functions.

Figure 5:
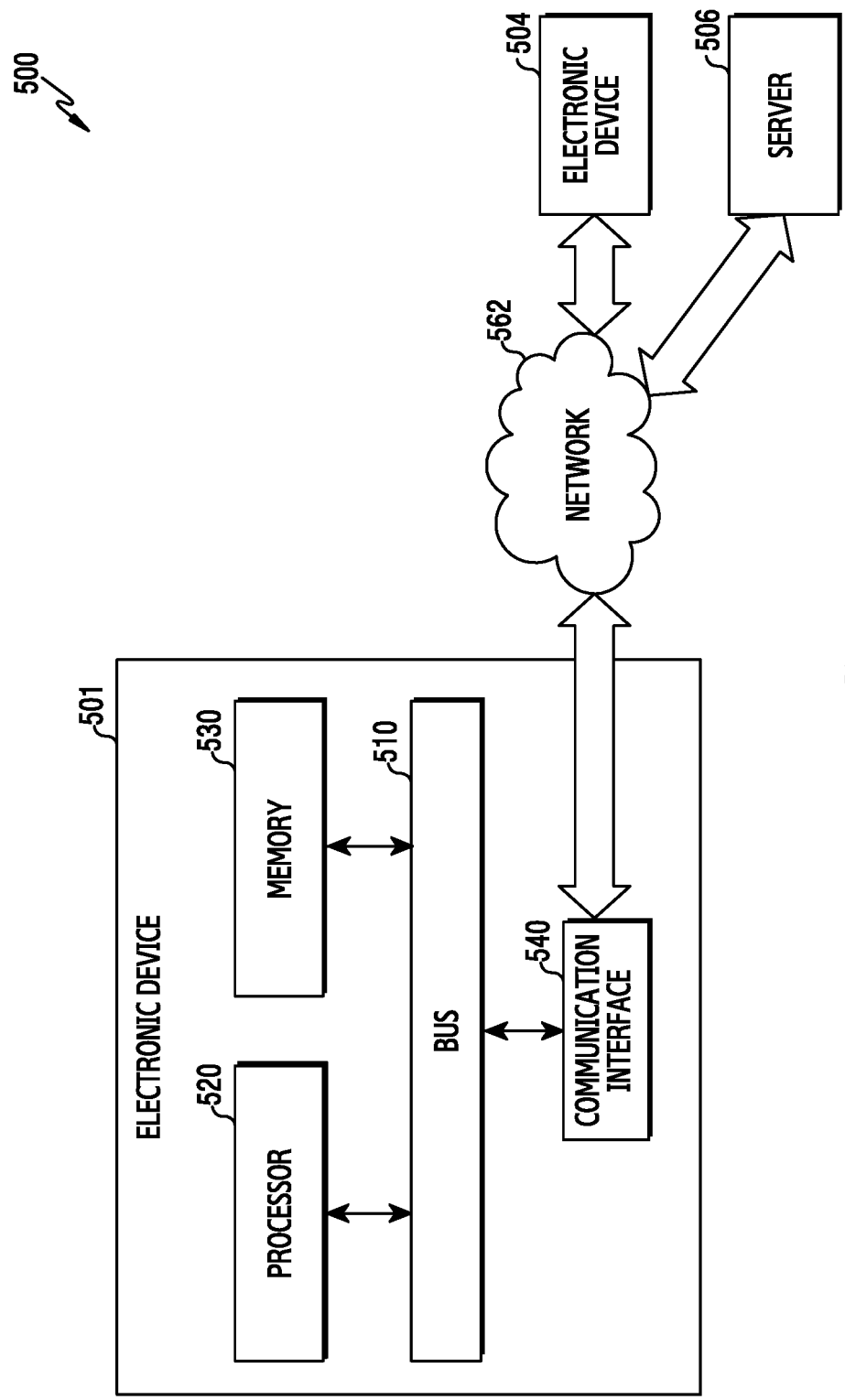
FIG. 5 is a block diagram of a server in a network environment according to an embodiment.

FIG. 5 is a block diagram of a server 501 in a network environment 500 according to an embodiment. The server 501 may be the first server 104 of FIG. 1, the second server 501 of FIG. 1, or a server in the form of integrating the first server 104 and the second server 108.

Referring to FIG. 5, the server 501 may include a bus 510, a processor 520, a memory 530, and a communication interface 540. In an embodiment, the electronic device 501 may omit at least one of the above elements or may further include other elements.

The bus 510 may include, for example, a circuit which interconnects the elements 520 to 540, and delivers a communication (e.g., a control message and/or data) between the elements.

The processor 520 may include one or more of a CPU and a CP. The processor 520, for example, may carry out operations or data processing relating to the control and/or communication of at least one other element of the electronic device 501.

According to an embodiment, the processor 520 may store and manager user profile information associated with at least one electronic device 504. The user profile information may include at least one of, for example, a phone number of an electronic device, a name, an event, a profile image, an address, an e-mail address, a web address, an organization, a group, a relationship with the electronic device 201, a nickname, and a status message. The processor 520 may store information indicating whether each of at least one electronic device subscribes to a dynamic call information display service in the memory 530, and may manage the same in the memory 530. The processor 520 may store a dynamic call information display service subscriber electronic device list indicating at least one electronic device that subscribes to the dynamic call information display service in the memory 530, and may manage the same.

According to an embodiment, the processor 520 may obtain and store dynamic call information associated with at least one electronic device that subscribes to the dynamic call information display service. The processor 520 may receive, from at least one electronic device, dynamic call information associated with the corresponding electronic device. The processor 520 may receive dynamic call information associated with at least one electronic device from another server 506. For example, the processor 520 may periodically receive dynamic call information associated with at least one electronic device from the other server 506. For example, when a signal for requesting dynamic call information of another electronic device is received from the electronic device 504, the processor 520 may transmit, to the server 506, a signal for requesting transmission of the dynamic call information of the other electronic device, and may receive the dynamic call information of the other electronic device in response thereto. The processor 520 may temporarily store dynamic call information associated with at least one electronic device in the memory 530. The dynamic call information may be configured as illustrated in FIGS. 1 and 2.

According to an embodiment, the processor 520 may receive a signal for requesting dynamic call information of another electronic device from the electronic device 504. The signal for requesting transmission of dynamic call information may include, for example, identification information of the other electronic device. The processor 520 may obtain dynamic call information corresponding to the identification information of the other electronic device from the memory 530, and may transmit a response signal including the obtained dynamic call information to the electronic device 504. The signal for requesting transmission of the dynamic call information may include a signal for inquiring about whether the other electronic device subscribes to the dynamic call information display service. For example, when the signal for inquiring about whether the other electronic device subscribes to the dynamic call information display service is received from the electronic device 504, the processor 520 may determine whether the other electronic device subscribes to the dynamic call information display service, based on the dynamic call information display service subscriber electronic device list stored in the memory 530. When the identification information of the other electronic device exists in the dynamic call information display service subscriber electronic device list, the processor 520 may determine that the other electronic device has subscribed to the dynamic call information display service, and may control a function for searching for the dynamic call information of the other electronic device from the memory 530 and transmitting the retrieved dynamic call information to the electronic device 504. When the identification information of the other electronic device does not exist in the dynamic call information display service subscriber electronic device list, the processor 520 may control a function of transmitting, to the electronic device 504, a response signal indicating that the other electronic device does not subscribe to the dynamic call information display service.

According to an embodiment, the processor 520 may synchronize contact information with at least one electronic device. For example, the processor 520 may receive a signal indicating that contact information of another electronic device has been updated from the electronic device 504, and may update, based on the received signal, user profile information of the other electronic device. The signal indicating that the contact information has been updated may include, for example, information indicating contact information associated with the other electronic device has been added, changed, or deleted. The processor 520 may control the communication interface 540 to transmit a contact information update response signal indicating that synchronization is completed to the electronic device 504. The processor 520 may determine whether the other electronic device, the contact information of which has been updated, subscribes to the dynamic call information display service, and may control the communication interface 540 such that the contact update response signal including information indicating whether the other electronic device subscribes to the dynamic call information display service is transmitted to the electronic device 504.

The memory 530 may include a volatile and/or non-volatile memory. The memory 530 may store, for example, commands or data relevant to at least one other element of the server 501. According to an embodiment, the memory 530 may store profile information associated with at least one electronic device 504. The memory 530 may store a list indicating electronic devices that subscribe to the dynamic call information display service. The memory 530 may store dynamic call information associated with at least one electronic device.

The communication interface 540 may establish communication between the server 501 and an external device (e.g., the electronic device 504 and the server 506). For example, the communication interface 540 may be connected to the network 562 via wireless or wired communication to communicate with the external device. The communication interface 540 may transmit and receive a signal for communicating with another electronic device. The communication interface 540 may perform transmission and reception of a signal including dynamic call information with the electronic device 504 and/or the server 506 according to control of the processor 520.

The wireless communication may include, for example, cellular communication that uses at least one of LTE, LTE-A, CDMA, WCDMA, UMTS, WiBro, GSM, 5G network, and the like. According to an embodiment, wireless communication may include, for example, at least one (e.g., short-range communication) of WiFi, Li-Fi, Bluetooth, BLE, Zigbee, NFC, MST, RF, and BAN. Wireless communication may include a GNSS. The GNSS may be, for example, a GPS, a Glonass, Beidou, or Galileo. The wired communication may include, for example, at least one of a USB, an HDMI, an RS-232, a power line communication, optical communication, a POTS, and the like. The network 562 may include a telecommunications network, for example, at least one of a computer network (e.g., a LAN or a WAN), the Internet, and a telephone network.

According to an embodiment, an electronic device includes a display, a communication interface, at least one processor, and a memory electrically connected to the processor, wherein, upon execution, the memory is configured to store instructions that enable the at least one processor to detect that a call event associated with another electronic device occurs; obtain call-related information associated with the other electronic device; detect at least one piece of information corresponding to a call state with the other electronic device from the obtained call-related information; and control the display to display a screen including the at least one piece of detected information and information indicating the call state with the other electronic device.

According to an embodiment, the call-related information may include at least one of at least one piece of information corresponding to a call connection attempt state, at least one piece of information corresponding to a call-connected state, and at least one piece of information corresponding to a call-terminated state.

According to an embodiment, the call-related information may include at least one of common call-related information that is commonly applied to a plurality of electronic devices including the electronic device, or dedicated call-related information applied to the electronic device.

According to an embodiment, the memory may be configured to store instructions to detect at least one piece of first information corresponding to the call state with the other electronic device from the common call-related information; detect at least one piece of second information corresponding to the call state with the other electronic device from the dedicated call-related information; and control the display to display a screen including the first information, the second information, and information indicating the call state with the other electronic device.

According to an embodiment, the memory is configured to store instructions to determine whether the dedicated call-related information is registered in a server based on a received signal; and when the dedicated call-related information is registered in the server, control the communication interface to transmit a signal for requesting transmission of the call-related information associated with the other electronic device to the server.

According to an embodiment, the memory is configured to store instructions to store at least one piece of information in the memory based on a storage characteristic associated with the each of the at least one piece of information included in the communication-related information, wherein the storage characteristic is set as one of a volatile characteristic and a non-volatile characteristic.

According to an embodiment, the memory is configured to store instructions to delete the call-related information associated with the other electronic device based on the number of times that a call event associated with the other electronic device occurs.

According to an embodiment, the memory is configured to store instructions to receive additional information transmitted from the other electronic device during a call-connected state with the other electronic device; and control to display the additional information on the display.

According to an embodiment, the call-related information may include at least one of an image, text, an animation image, a game, music, a video, a URL, weather, haptic data, handwriting, or 3D content thereof.

According to an embodiment, the memory is configured to store instructions to detect that the call state with the other electronic device is changed; detect at least one piece of information corresponding to the changed call state from the obtained call-related information; and control the display to display a screen including at least one piece of information corresponding to the changed call state and information indicating the changed call state.

According to an embodiment, the memory is configured to store instructions to detect a call-related information registration event associated with the electronic device; control the display to display a call-related information registration screen associated with the electronic device; receive call-related information associated with the electronic device via a user input for the call-related information registration screen; and control the communication interface to transmit the received call-related information associated with the electronic device to the server.

According to an embodiment, the call-related information registration screen associated with the electronic device may include at least one of at least one item for receiving input of common call-related information that is commonly applied to a plurality of other electronic devices, or at least one item for receiving input of dedicated call-related information applied to a designated electronic device.

According to an embodiment, a server device includes a communication interface; at least one processor; and a memory electrically connected to the processor, wherein, upon execution, the memory is configured to store instructions to enable at least one processor to obtain call-related information associated with at least one electronic device; receive a signal for requesting call-related information associated with a second electronic device from a first electronic device; and control the communication interface to transmit the call-related information associated with the second electronic device to the first electronic device in response to the received signal, where the communication-related information includes at least one of at least one piece of information corresponding to a call connection attempt state, at least one piece of information corresponding to a call-connected state, or at least one piece of information corresponding to a call-terminated state.

Figure 6:
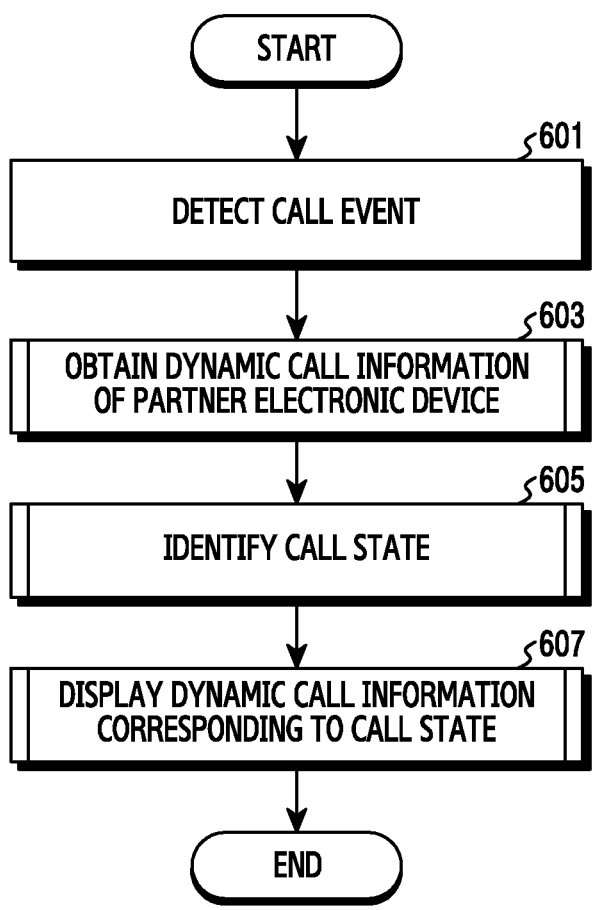
FIG. 6 is a flowchart of a process of displaying a screen based on a call state by an electronic device according to an embodiment.

FIG. 6 is a flowchart of a process of displaying a screen based on a call state by an electronic device according to an embodiment. Operations may be performed sequentially but are not required to be performed sequentially. For example, the order of the operations may be changed, and at least two operations may be performed in parallel. The electronic device may be the first electronic device 100, the second electronic device 102 of FIG. 1, or the electronic device 201 of FIG. 2.

Referring to FIG. 6, the electronic device (e.g., the processor 220) may detect a call event in operation 601. For example, the processor 220 of the electronic device may detect, based on a user input, that an outgoing call event occurs. For example, the processor 220 of the electronic device may detect that an incoming call event occurs, based on the fact that a signal indicating that an incoming call event occurs is received.

According to an embodiment, the electronic device (e.g., the processor 220) may obtain dynamic call information of a partner electronic device in operation 603. The processor 220 of the electronic device may obtain dynamic call information based on the identification information of the partner electronic device. The processor 220 of the electronic device may receive dynamic call information from a server by controlling the communication interface 270. For example, the processor 220 of the electronic device may control the communication interface 270 such that a dynamic call information request signal including the identification information of the partner electronic device is transmitted to the server, and the dynamic call information of the partner electronic device is received from the server in response to the dynamic call information request signal. The processor 220 of the electronic device may obtain the dynamic call information corresponding to the identification information of the partner electronic device from the memory 230 of the electronic device. For example, the processor 220 of the electronic device may obtain dynamic call information, which was obtained from the server when a call event associated with the partner electronic device previously occurred and was stored in the memory 230. The dynamic call information may include information that must be displayed on a screen according to a call state between the electronic device and the partner electronic device. The dynamic call information may include at least one of information corresponding to a call connection attempt state, information corresponding to a call-connected state, and information corresponding to a call connection-terminated state. The dynamic call information may include at least one of, for example, outgoing prologue information, incoming prologue information, logo information, epilogue information, a message, a phone number, and a name, and may include call state information corresponding to each information. For example, the dynamic call information may include information, such as (1) call connection attempt state information: outgoing prologue information, incoming prologue information, a message, a phone number, and name (2) call connected-state information: logo information, a phone number, and a name; and (3) call-terminated state information: epilogue, a phone number, and a name.

The above-described information included in the dynamic call information are merely examples, and the dynamic call information of the present document is not intended to be limited thereto. The dynamic call information may include various types of contents. For example, the dynamic call information may include various types of contents, such as an image, text, an animation image, a game, music, a video, a URL, weather, haptic data, handwriting, or 3D content. The dynamic call information may include common-dynamic call information that is commonly applied to a plurality of other electronic devices, and dedicated-dynamic call information applied to a predetermined electronic device. The dedicated-dynamic call information may include identification information of a predetermined electronic device to which the dedicated-dynamic call information is to be applied. The dedicated-dynamic call information may include information indicating whether the corresponding information is to be used every time a call with the predetermined electronic device is made, or whether the corresponding information is to be used for just one call with the corresponding electronic device. For example, the dedicated-dynamic call information may include characteristic information indicating whether the corresponding information is single-use information. Dynamic call information may include information indicating the storage characteristic for each information. For example, the dynamic call information may include information indicating whether common-dynamic call information is non-volatile information or volatile information. For example, the dynamic call information may include information indicating whether dedicated-dynamic call information is non-volatile information or volatile information. For example, the dynamic call information may include information indicating whether information corresponding to each call state is non-volatile information or volatile information.

According to an embodiment, the electronic device (e.g., the processor 220) may identify a call state in operation 605. For example, the processor 220 of the electronic device may determine whether the call state with the partner electronic device corresponds to a call connection attempt state, a call-connected state, or a call-terminated state. The processor 220 of the electronic device may identify the call state with the partner electronic device using a phone application.

According to an embodiment, the electronic device (e.g., the processor 220) may display dynamic call information corresponding to the call state in operation 607. For example, the processor 220 of the electronic device may perform control to detect dynamic call information corresponding to the current call state from the dynamic call information obtained in operation 603, and to display, on the display 260, a screen that includes the detected dynamic call information and indicates the call state. The processor 220 of the electronic device may perform control such that a screen including the dynamic call information associated with a call state is displayed on the display 260, based on the detected type of call event. For example, the processor 220 of the electronic device may perform control to distinguish whether the detected call event is an outgoing event or an incoming event, and to display, on the display 260, a screen that indicates a call state and includes dynamic call information corresponding to the current call state, based on whether the detected call event is the outgoing event or the incoming event.

Figure 7A:
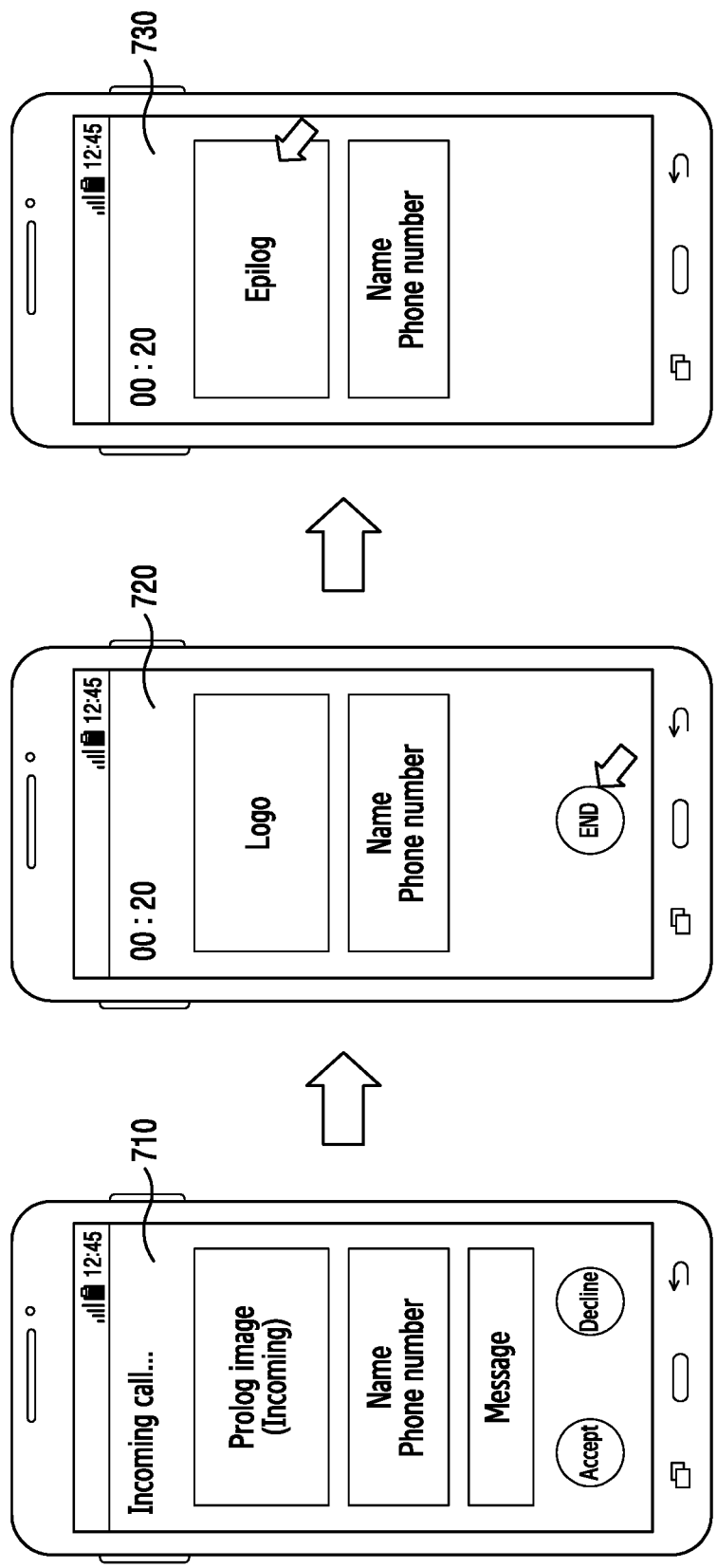
FIGS. 7A and 7B are diagrams of screen configurations based on a call state in an electronic device according to an embodiment.
Figure 7B:
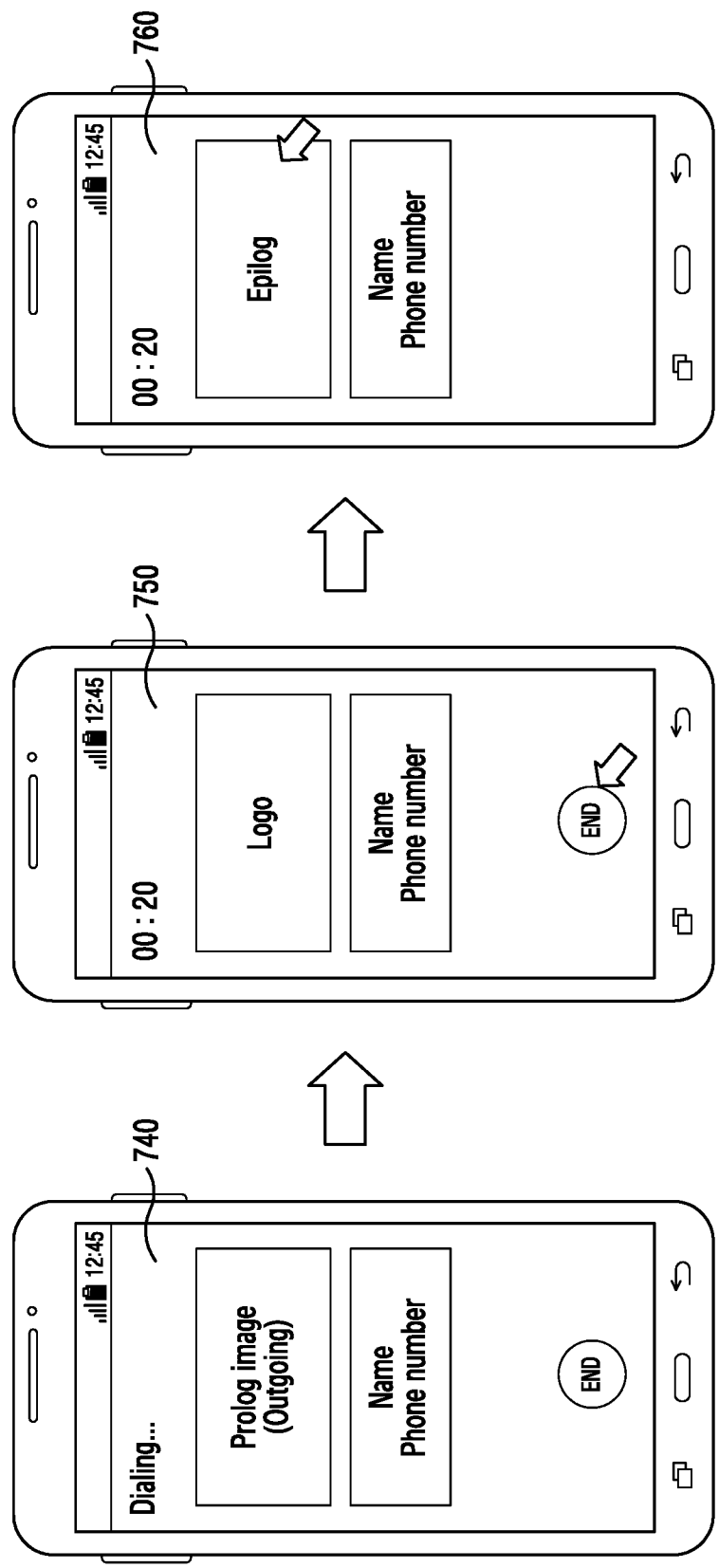

FIGS. 7A and 7B are illustrations of screen configurations based on a call state in an electronic device according to an embodiment.

Referring to FIGS. 7A and 7B, for example, when a detected call event corresponds to an incoming event, the processor 220 of the electronic device may control an incoming call screen including at least one different information according to a call state being displayed on the display 260, as illustrated in FIG. 7A. For example, when a detected call event corresponds to an outgoing event, the processor 220 of the electronic device may perform control such that an outgoing call screen including at least one different information according to a call state is displayed on the display 260, as illustrated in FIG. 7B. For example, when the detected call event corresponds to an incoming event, and the current state is a call connection attempt state, the processor 220 of the electronic device may perform control such that an incoming call connection attempt screen 710 including an incoming prologue image, a name, a phone number, and a message is displayed on the display 260, as illustrated in FIG. 7A. When the call state is changed from the call connection attempt state to a call-connected state, the processor 220 of the electronic device may perform control such that an incoming call-connected screen 720 including a logo image, a name, and a phone number is displayed on the display 260. When the call state is changed from the call-connected state to a call-terminated state, the processor 220 of the electronic device may perform control such that an incoming call-terminated screen 730 including an epilogue image, a name, and a phone number is displayed on the display 260. For example, when the detected call event corresponds to an outgoing event, and the current state is a call connection attempt state, the processor 220 of the electronic device may perform control such that an outgoing call connection attempt screen 740 including an outgoing prologue image, a name, a phone number, and a message is displayed on the display 260, as illustrated in FIG. 7B. When the call state is changed from the call connection attempt state to a call-connected state, the processor 220 of the electronic device may perform control such that an outgoing call-connected screen 750 including a logo image, a name, and a phone number is displayed on the display 260. When the call state is changed from the call-connected state to a call-terminated state, the processor 220 of the electronic device may perform control such that an outgoing call-terminated screen 760 including an epilogue image, a name, and a phone number is displayed on the display 260.

A case in which only a prologue image from among dynamic call information is distinguished as an outgoing prologue image and an incoming prologue image is described above. However, at least one other information included in the dynamic call information may be distinguished as outgoing information and incoming information. When common-dynamic call information and dedicated-dynamic call information corresponding to the current call state are included in the dynamic call information, the electronic device may display the dedicated-dynamic call information corresponding to the current call state on a screen. For example, when a Samsung Electronics image and a message "Hello, it is Samsung Electronics" are included in dynamic call information as common-dynamic call information corresponding to a call connection attempt state, and a Samsung Electronics image and a message "Mr. XXX. This call is a confirmation call for repair that you ask."

are included as dedicated-dynamic call information corresponding to the call connection attempt state, the electronic device may display the Samsung Electronics image and "Mr. XXX. This call is a confirmation call for repair that you ask.", which are the dedicated-dynamic call information, on a call connection attempt screen. When common-dynamic call information and dedicated-dynamic call information corresponding to the current call state are included in dynamic call information, the processor 220 of the electronic device may perform control to display, on the screen, at least a part of the common-dynamic call information corresponding to the current call state and the dedicated dynamic call information together. For example, when a Samsung Electronics image and a message "Hello, it is Samsung Electronics" are included in the dynamic call information as common-dynamic call information corresponding to the call connection attempt state, and a message "Mr. XXX. This call is a confirmation call for repair that you ask." is included as dedicated-dynamic call information corresponding to the call connection attempt state, the processor 220 of the electronic device may perform control to display, on the call connection attempt screen, the Samsung Electronics image which is the common-dynamic call information and "Mr. XXX. This call is a confirmation call for repair that you ask." which is the dedicated-dynamic call information.

Figure 8:
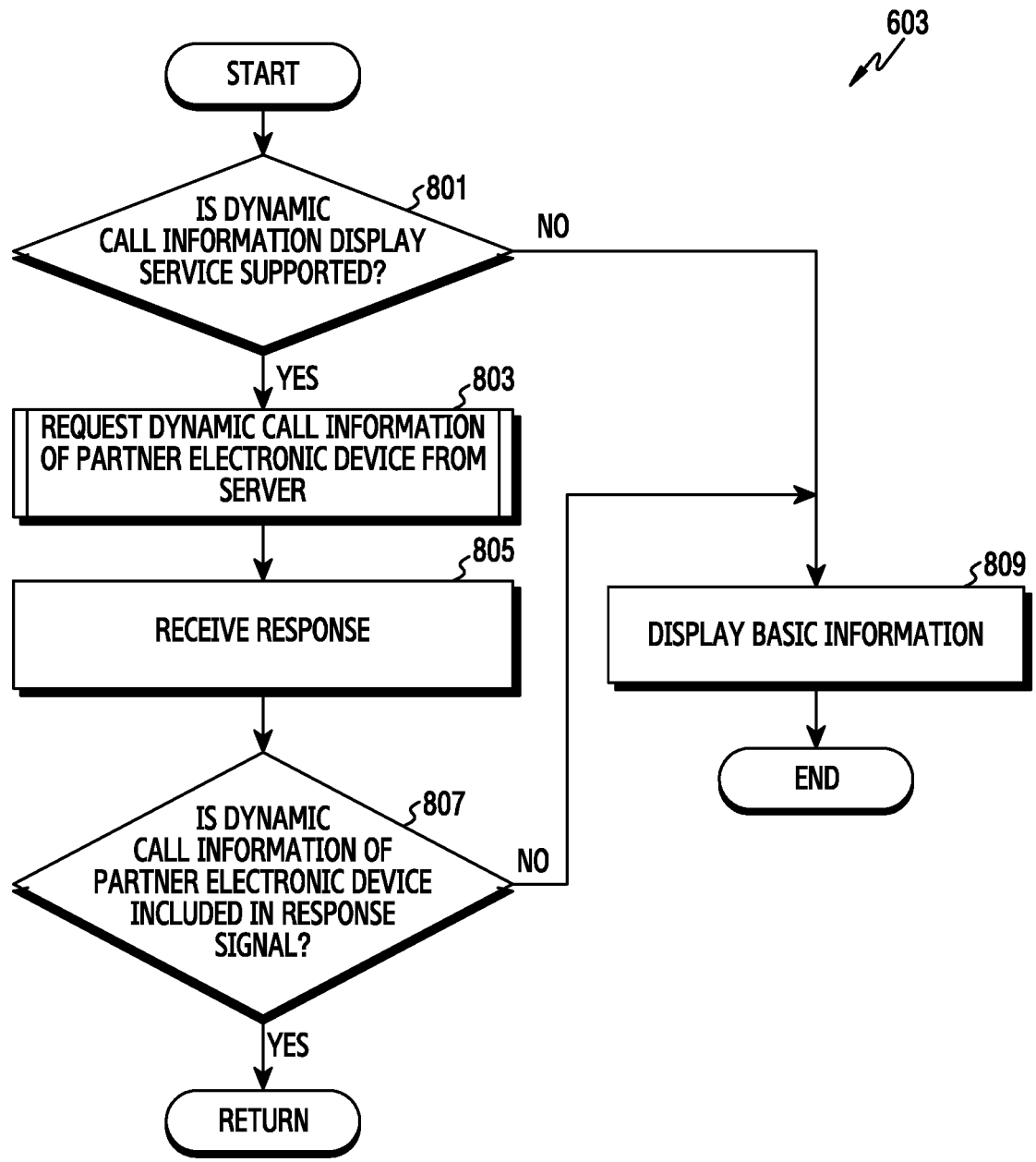
FIG. 8 is a flowchart of a process of obtaining dynamic call information by an electronic device according to an embodiment.

FIG. 8 is a flowchart of a process of obtaining dynamic call information by an electronic device according to an embodiment. Hereinafter, operation 603 of FIG. 6 is described in greater detail. Operations may be performed sequentially but are not required to be performed sequentially. For example, the order of the operations may be changed, and at least two operations may be performed in parallel. The electronic device may be the first electronic device 100, the second electronic device 102 of FIG. 1, or the electronic device 201 of FIG. 2.

Referring to FIG. 8, the electronic device (e.g., the processor 220) may determine whether the electronic device supports a dynamic call information display service in operation 801. The processor 220 of the electronic device may determine whether the electronic device supports the dynamic call information display service, based on information stored in the memory 230. For example, the processor 220 of the electronic device may determine whether the electronic device supports the dynamic call information display service, based on information stored in the memory 230, the information indicating whether the electronic device subscribes to the dynamic call information display service. The processor 220 of the electronic device may determine whether the electronic device supports the dynamic call information display service, based on communication with a server via the communication interface 270. For example, the processor 220 of the electronic device may control the communication interface 270 such that a signal for inquiring whether the electronic device subscribes to the dynamic call information display service is transmitted to the server, and a response signal including information indicating whether the electronic device subscribes to the dynamic call information display service is received from the server.

According to an embodiment, when the electronic device supports the dynamic call information display service, the electronic device (e.g., the processor 220) may request dynamic call information of a partner electronic device from the server in operation 803. For example, the processor 220 of the electronic device may control the communication interface 270 to transmit, to the server, a dynamic call information request signal including identification information of the partner electronic device.

According to an embodiment, the electronic device (e.g., the processor 220) receives a response signal from the server in operation 805. For example, the processor 220 of the electronic device may receive the response signal in response to the dynamic call information request signal, from the server via the communication interface 270. The response signal may include the dynamic call information of the partner electronic device. The response signal may include information indicating that the dynamic call information of the partner electronic device is not registered in the server, or information indicating that the partner electronic device does not subscribe to the dynamic call information display service.

According to an embodiment, the electronic device (e.g., the processor 220) may determine whether the dynamic call information of the partner electronic device is included in the response signal in operation 807. When the dynamic call information of the partner electronic device is included in the response signal, the processor 220 of the electronic device may obtain the dynamic call information from the response signal.

According to an embodiment, when the dynamic call information of the partner electronic device is not included in the response signal, the electronic device (e.g., the processor 220) may display basic information associated with the partner electronic device in operation 809. The basic information may include at least one of, for example, identification information of the partner electronic device and user profile information of the partner electronic device stored that is stored in a contact database. When information indicating that the dynamic call information of the partner electronic device is not registered in the server or information indicating that the partner electronic device does not subscribe to the dynamic call information display service is included in the response signal, the processor 220 of the electronic device may determine that obtaining the dynamic call information fails, and determine whether contact information corresponding to the identification information of the partner electronic device exists in the contact information database. When the contact information corresponding to the identification information of the partner electronic device exists in the contact information database, the processor 220 of the electronic device may display a call connection attempt state screen, a call-connected state screen, and a call-terminated state screen, based on at least one piece of information included in the corresponding contact information (e.g., a phone number, a name, a profile image, or the like). When the contact information corresponding to the identification information of the partner electronic device does not exist in the contact information database, the processor 220 of the electronic device may perform control such that a call connection attempt state screen, a call-connected state screen, a call-terminated state screen is displayed on the display 260, based on the identification information of the partner electronic device.

According to an embodiment, when it is determined that the electronic device does not support the dynamic call information display service in operation 801, the electronic device (e.g., the processor 220) may perform above-described operation 809.

Figure 9:
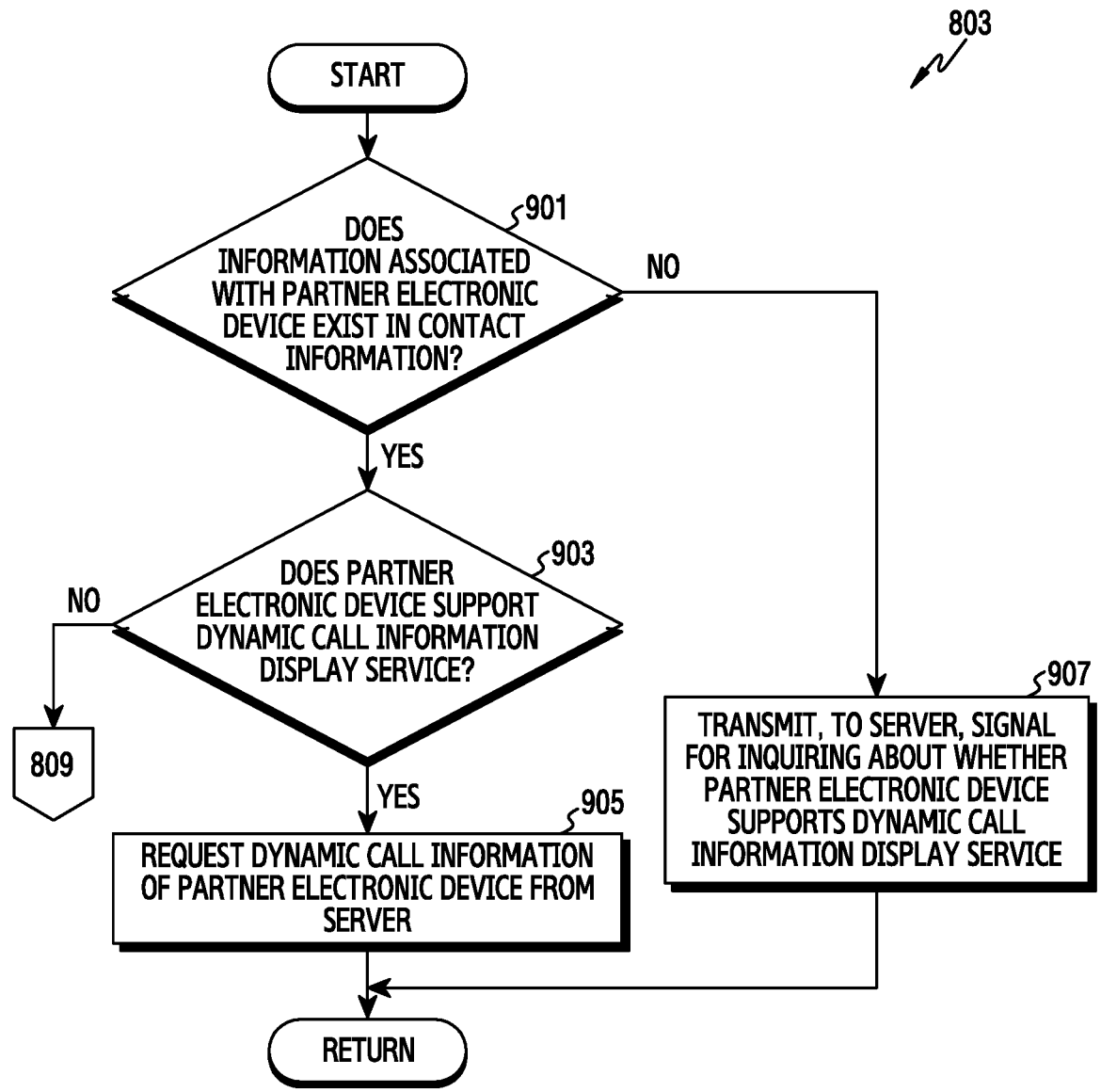
FIG. 9 is a flowchart of a process of requesting dynamic call information by an electronic device according to an embodiment.

FIG. 9 is a flowchart of a process of requesting dynamic call information by an electronic device according to an embodiment. Operation 803 of FIG. 8 is described below in greater detail. Operations may be performed sequentially but are not required to be performed sequentially. For example, the order of the operations may be changed, and at least two operations may be performed in parallel. The electronic device may be the first electronic device 100, the second electronic device 102 of FIG. 1, or the electronic device 201 of FIG. 2.

Referring to FIG. 9, the electronic device (e.g., the processor 220) may determine whether information associated with a partner electronic device exists in a contact information database in operation 901. For example, the processor 220 of the electronic device may determine whether contact information corresponding to the identification information of the partner electronic device exists in the contact information database.

According to an embodiment, when the information associated with the partner electronic device exists in the contact information database, the electronic device (e.g., the processor 220) may determine whether the partner electronic device supports a dynamic call information display service, based on the information stored in the contact information database in operation 903. For example, the processor 220 of the electronic device may identify information indicating whether the partner electronic device subscribes to the dynamic call information display service from the contact information database. The information indicating whether the partner electronic device subscribes to the dynamic call information display service may be received in advance from the server when synchronization of the contact information is performed with the partner electronic device. Receiving, in advance, the information indicating whether the partner electronic device subscribes to the dynamic call information display service is described below in greater detail with reference to FIG. 10.

According to an embodiment, when the electronic device supports the dynamic call information display service, the electronic device (e.g., the processor 220) may transmit, to the server, a signal for requesting the dynamic call information of the partner electronic device in operation 905. The signal for requesting the dynamic call information of the partner electronic device may include identification information of the partner electronic device. The processor 220 of the electronic device may receive a response signal as described above with reference to operation 805 via the communication interface 270, in response to the signal for requesting the dynamic call information of the partner electronic device.

According to an embodiment, when the partner electronic device does not support the dynamic call information display service, the electronic device (e.g., the processor 220) may proceed with operation 809 of FIG. 8, and may display basic information on a screen.

According to an embodiment, when information associated with the partner electronic device does not exist in the contact information database, the electronic device (e.g., the processor 220) may transmit, to the server, a signal for inquiring about whether the partner electronic device supports the dynamic call information display service in operation 907. The signal for inquiring about whether the partner electronic device supports the dynamic call information display service may include the identification information of the partner electronic device. The electronic device may receive a response signal as described above with reference to operation 805 via the communication interface 270, in response to the signal for inquiring about whether the partner electronic device supports the dynamic call information display service.

Figure 10:
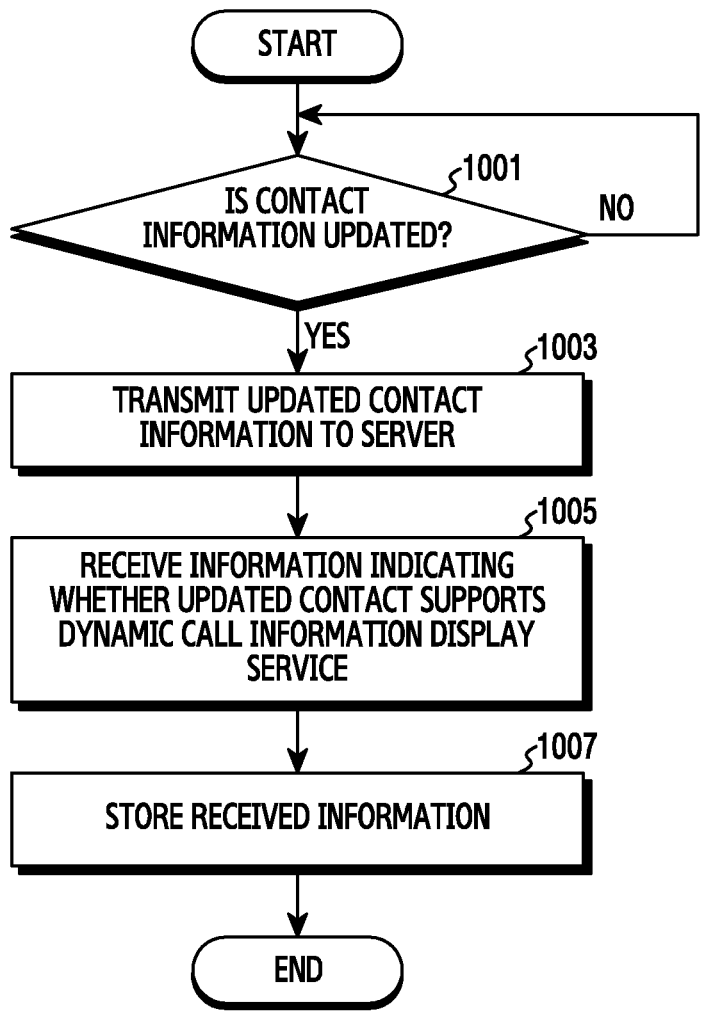
FIG. 10 is a flowchart of a process of synchronizing contact information by an electronic device according to an embodiment.

FIG. 10 is a flowchart of a process of synchronizing contact information by an electronic device according to an embodiment. Operations may be performed sequentially but are not required to be performed sequentially. For example, the order of the operations may be changed, and at least two operations may be performed in parallel. The electronic device may be the first electronic device 100, the second electronic device 102 of FIG. 1, or the electronic device 201 of FIG. 2.

Referring to FIG. 10, the electronic device (e.g., the processor 220) may determine whether contact information is updated in operation 1001. For example, the processor 220 of the electronic device may determine whether contact information (or user profile information) associated with at least one other electronic device included in a contact information database is added, changed, or deleted.

According to an embodiment, when the contact information is updated, the electronic device (e.g., the processor 220) may transmit the updated contact information to a server in operation 1003. For example, the processor 220 of the electronic device may control the communication interface 270 to transmit the updated contact information to the server, in order to synchronize the contact information with the server. The processor 220 of the electronic device may control the communication interface 270 to transmit the updated contact information to the server every time that contact information is updated. Every time that a predetermined synchronization period elapses, the processor 220 of the electronic device may identify contact information updated during a period between a previous synchronization point and the current synchronization point, and may control the communication interface 270 to transmit the updated contact information to the server.

According to an embodiment, the electronic device (e.g., the processor 220) may receive, from the server, information indicating whether a partner electronic device corresponding to the updated contact information supports the dynamic call information display service in operation 1005. For example, the processor 220 of the electronic device may receive a response signal indicating that synchronization of the updated contact information has been completed from the server via the communication interface 270, and the received response signal may include information indicating whether the partner electronic device corresponding to the updated contact information supports the dynamic call information display service.

According to an embodiment, the electronic device (e.g., the processor 220) may store the information indicating whether the partner electronic device supports the dynamic call information display service in the contact information database in operation 1007. For example, the processor 220 of the electronic device may map, onto identification information of the partner electronic device, the information indicating whether the partner electronic device supports the dynamic call information display service, and may store the same.

Figure 11:
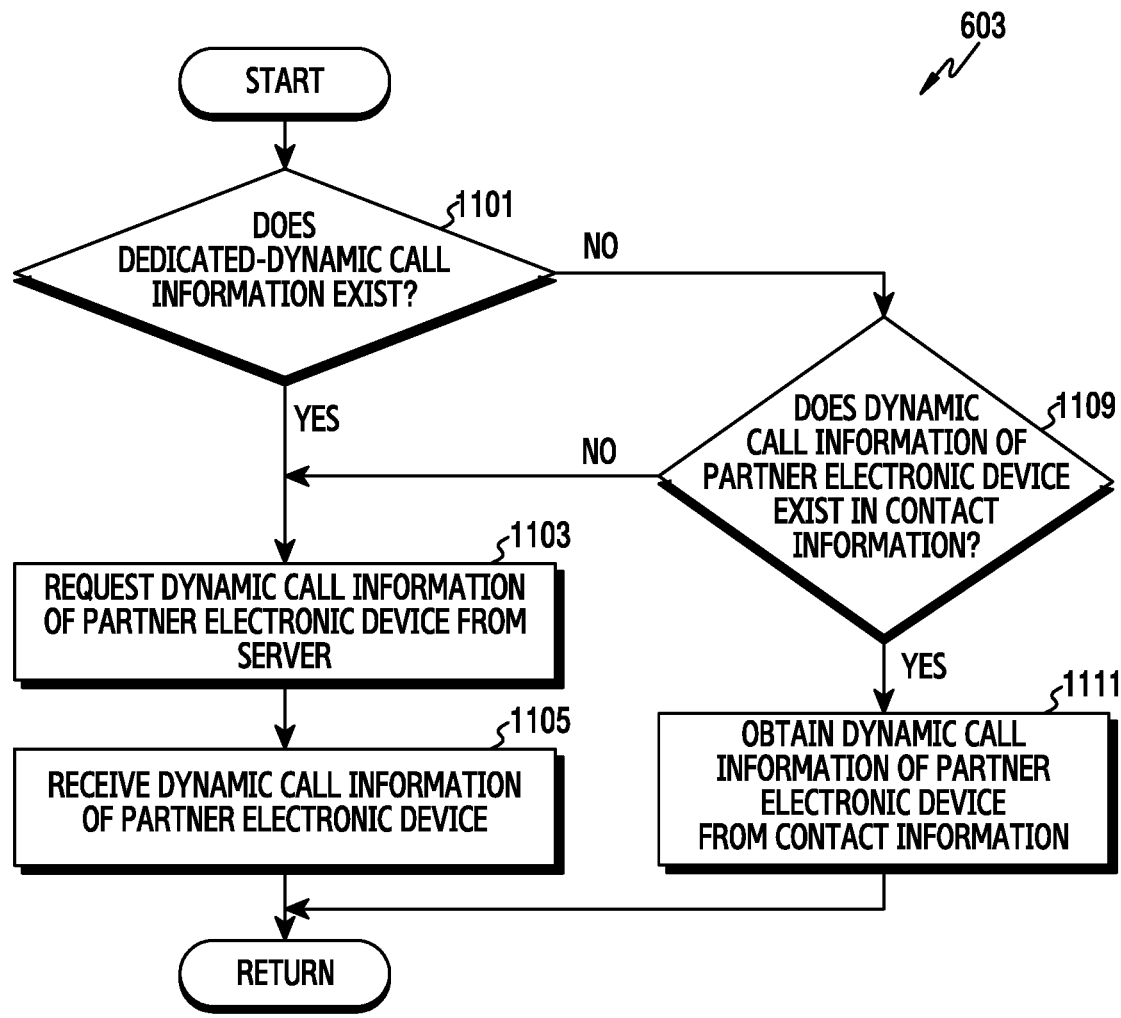
FIG. 11 is a flowchart of a process of obtaining dynamic call information by an electronic device according to an embodiment.

FIG. 11 is a flowchart of a process of obtaining dynamic call information by an electronic device according to an embodiment. Operation 603 of FIG. 6 is described below in greater detail. Operations may be performed sequentially but are not required to be performed sequentially. For example, the order of the operations may be changed, and at least two operations may be performed in parallel. The electronic device may be the first electronic device 100, the second electronic device 102 of FIG. 1, or the electronic device 201 of FIG. 2.

Referring to FIG. 11, the electronic device (e.g., the processor 220) may determine whether dedicated-dynamic call information that sets the electronic device as a target exists in operation 1101. The processor 220 of the electronic device may analyze a signal indicating the occurrence of an incoming call associated with a partner electronic device, and may determine whether dedicated-dynamic call information exists. For example, the signal indicating the occurrence of an incoming call associated with an electronic device may include information indicating whether dedicated-dynamic call information exists.

According to an embodiment, when the dedicated-dynamic call information exists, the electronic device (e.g., the processor 220) may request dynamic call information of the partner electronic device from a server in operation 1103. For example, the processor 220 of the electronic device may control the communication interface 270 to transmit, to the server, a dynamic call information request signal including identification information of the partner electronic device. For example, the processor 220 of the electronic device may identify that the partner electronic device registers dedicated-dynamic call information that sets the electronic device as a target, and may control the communication interface 270 to transmit a dynamic call information request signal to the server in order to obtain the dynamic call information including the dedicated-dynamic call information.

According to an embodiment, the electronic device (e.g., the processor 220) may receive the dynamic call information of the partner electronic device in operation 1105. For example, the processor 220 of the electronic device may receive a response signal including the dynamic call information via the communication interface 270, in response to the dynamic call information request signal. The dynamic call information may include common-dynamic call information that is commonly applied to a plurality of electronic devices, and dedicated-dynamic call information that is only applied to the electronic device.

According to an embodiment, when the dedicated-dynamic call information does not exist, the electronic device may determine whether the dynamic call information of the partner electronic device exists in contact information in operation 1109. For example, the processor 220 of the electronic device may determine whether dynamic call information, which was obtained in advance when a previous call event associated with the partner electronic device occurred, exists in a contact information database. When the dynamic call information of the partner electronic device does not exist in the contact information, the processor 220 of the electronic device may control the communication interface 270 to request the dynamic call information of the partner electronic device from the server in operation 1103.

According to an embodiment, when the dynamic call information of the partner electronic device exists in the contact information, the electronic device (e.g., the processor 220) may obtain the dynamic call information of the partner electronic device from the contact information in operation 1111. For example, the processor 220 of the electronic device may identify that the partner electronic device does not register the dedicated-dynamic call information that sets the electronic device as a target, and may determine to use dynamic call information stored in the electronic device in order to display dynamic call information based on a call state.

Figure 12A:
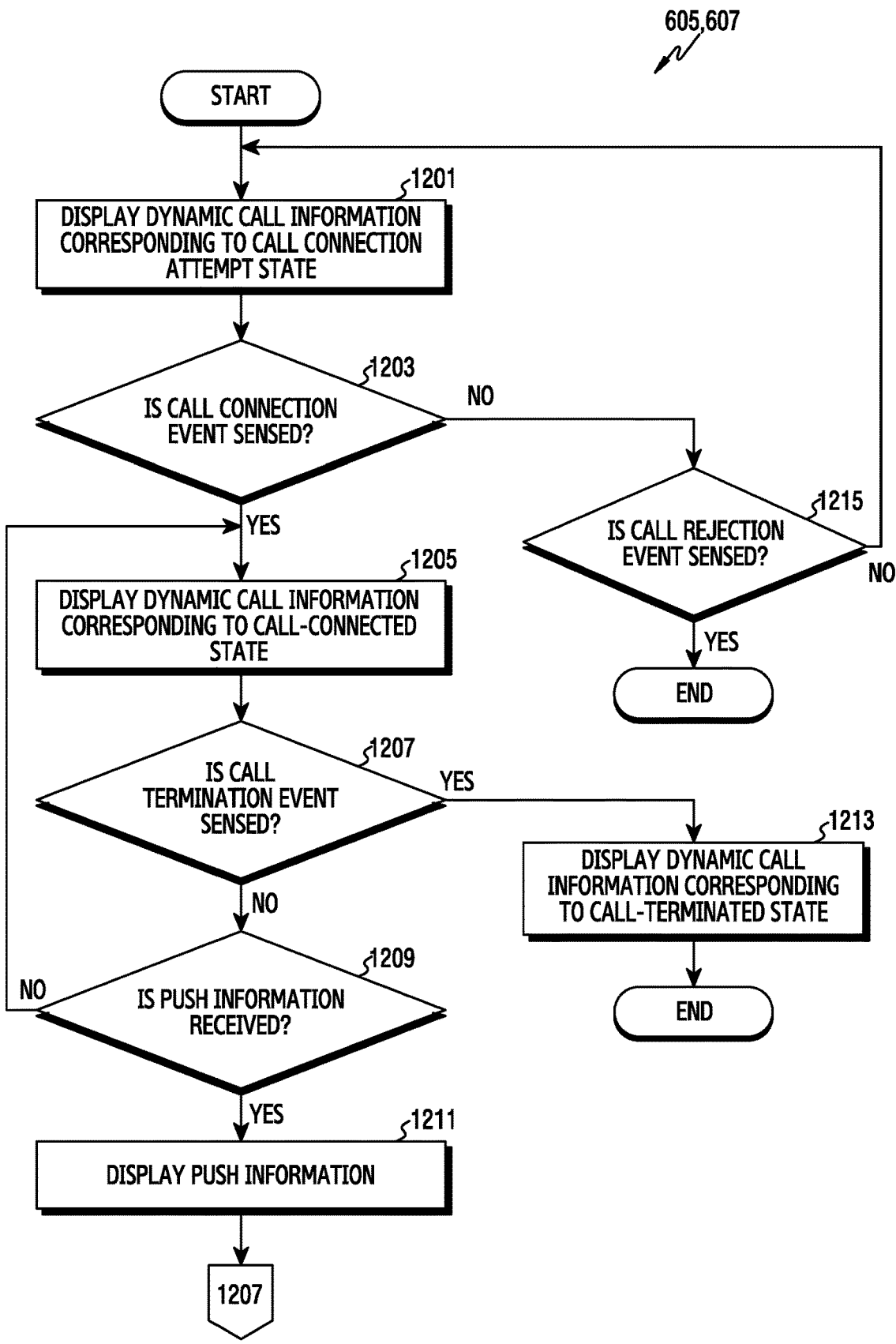
FIG. 12A is a flowchart of a process of displaying a screen based on a call state by an electronic device according to an embodiment.
Figure 12B:
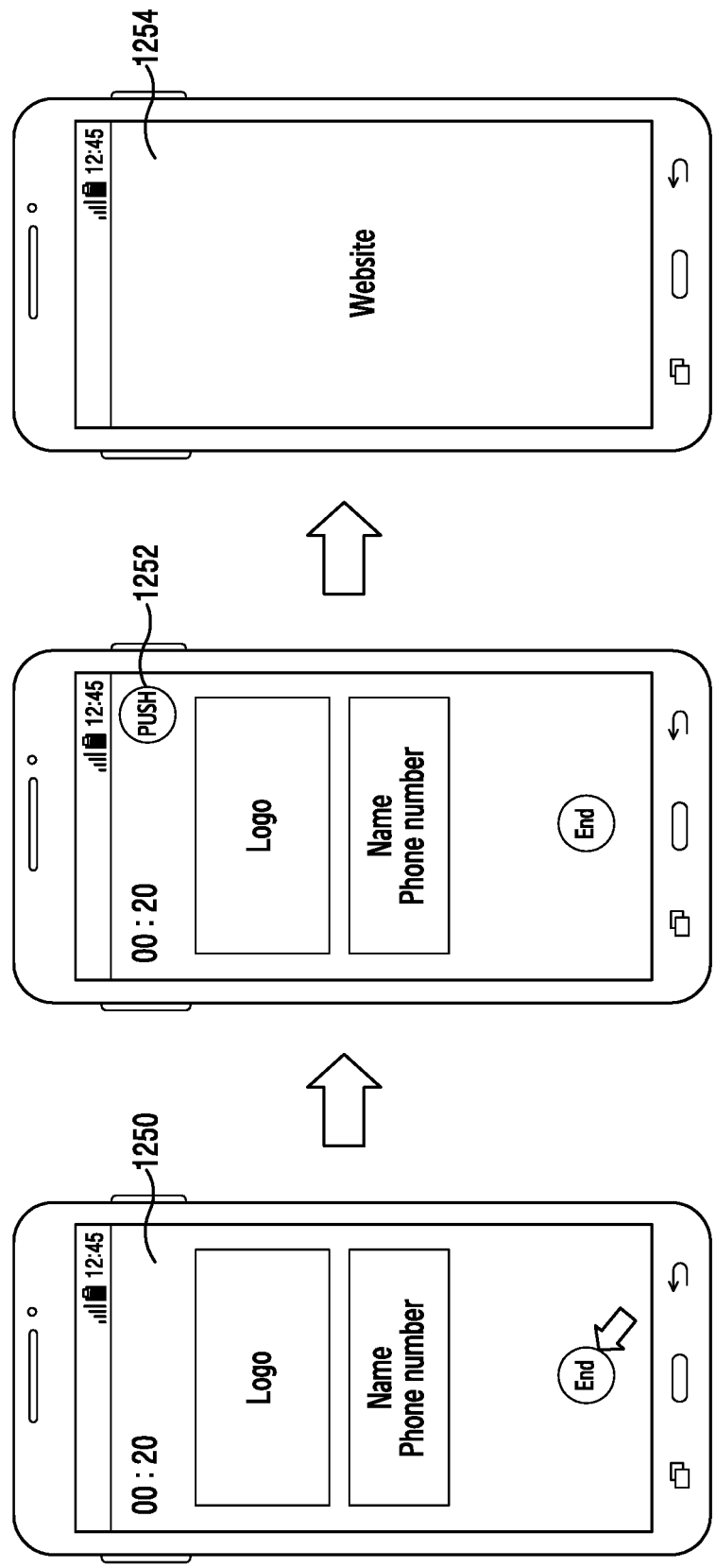
FIGS. 12B and 12C are illustrations of screen configurations of an electronic device upon reception of push information during a call-connected state according to an embodiment.
Figure 12C:
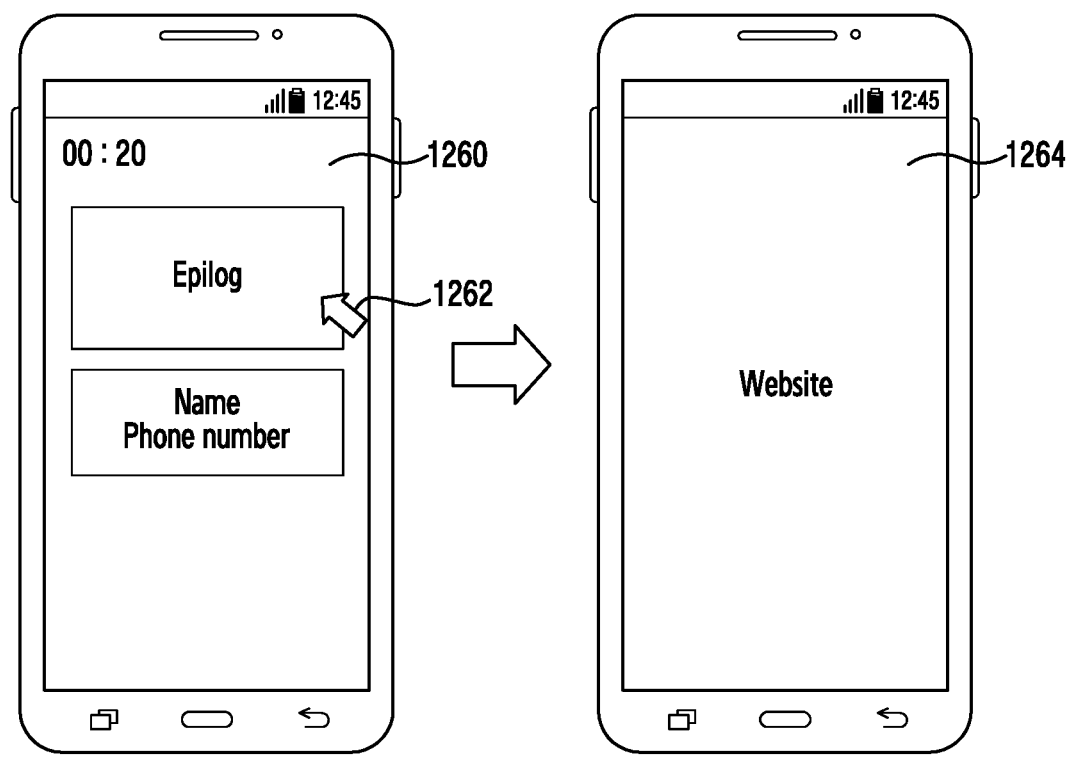

FIG. 12A is a flowchart of a process of displaying a screen based on a call state by an electronic device according to an embodiment, and FIGS. 12B and 12C are illustrations thereof. Operations 605 and 607 of FIG. 6 are described below in greater detail. Operations may be performed sequentially but are not required to be performed sequentially. For example, the order of the operations may be changed, and at least two operations may be performed in parallel. The electronic device may be the first electronic device 100, the second electronic device 102 of FIG. 1, or the electronic device 201 of FIG. 2.

Referring to FIGS. 12A, 12B, and 12C, the electronic device (e.g., the processor 220) may display dynamic call information corresponding to a call state in operation 1201. For example, the processor 220 of the electronic device may control the display 260 to display an incoming call connection attempt screen 710 including an incoming prologue image, a name, a phone number, and a message, as illustrated in screen 710 of FIG. 7A. For example, the processor 220 of the electronic device may control the display 260 to display an outgoing call connection attempt screen 740 including an outgoing prologue image, a name, a phone number, and a message, as illustrated in screen 740 of FIG. 7B.

According to an embodiment, the electronic device (e.g., the processor 220) may determine whether a call connection event is detected (e.g. sensed) in operation 1203. For example, when the detected call event is an incoming call event, the processor 220 of the electronic device may detect a call connection event, based on a user input. For example, when the detected call event is an outgoing call event, the processor 220 of the electronic device may detect a call connection event, based on a received signal informing that a call connection is successfully performed.

According to an embodiment, when the call connection event is detected, the electronic device (e.g., the processor 220) may display dynamic call information corresponding to a call-connected state in operation 1205. For example, the processor 220 of the electronic device may control the display 260 to display the incoming call connection attempt screen 720 including a log image, a name, and a phone number, as illustrated in screen 720 of FIG. 7A. For example, the processor 220 of the electronic device may control the display 260 to display an outgoing call connection attempt screen 750 including a log image, a name, and a phone number, as illustrated in screen 750 of FIG. 7B.

According to an embodiment, the electronic device (e.g., the processor 220) may determine whether a call termination event is detected in operation 1207. For example, the processor 220 of the electronic device may detect a call termination event, based on a user input. For example, the processor 220 of the electronic device may detect the call termination event, based on a received signal indicating that a call connection is terminated.

According to an embodiment, when the call termination event is not detected, the electronic device (e.g., the processor 220) may determine whether push information is received in operation 1209. For example, the processor 220 of the electronic device may determine whether push information is received from a partner electronic device with which a call is connected.

According to an embodiment, when the push information is received, the electronic device (e.g., the processor 220) may display the push information in operation 1211. The processor 220 of the electronic device may control the display 260 such that dynamic call information corresponding to the call-connected state is displayed on a screen, and the push message is displayed on a predetermined area of the screen. The predetermined area where the push message is displayed may be the entirety or a part of the screen, and may be set and changed by a designer and/or a user. The processor 220 of the electronic device may control the display 260 such that the dynamic call information corresponding to the call-connected state is displayed on the screen, and a popup window including the push message is displayed. The processor 220 of the electronic device determines whether a URL exists in the push message, and when it is determined that the URL exists, the processor 220 may control the display 260 such that a website screen corresponding to the URL is displayed. For example, the processor 220 of the electronic device may execute a web view or a web browser application, and may control the display 260 such that the website screen corresponding to the corresponding URL is displayed via the executed application. For example, when the push information is received from the partner electronic device during a call-connected state, the processor 220 of the electronic device may control the display 260 to additionally display an icon 1252 indicating that the push information including a URL is received in the state of displaying a call-connected screen 1250 including a logo image, a name, and a phone number, as illustrated in FIG. 12B. When the processor 220 of the electronic device detects a user input for the icon 1252 indicating that the push information is received, the processor 220 may control the display 260 to display a website screen 1254 corresponding to the URL. For example, when the push information is received from the partner electronic device during the call-connected state, the processor 220 of the electronic device may control the display 260 to switch the state of displaying the call-connected screen 1250 including a logo image, a name, and a phone number, as illustrated in FIG. 12B to the state of displaying the website screen 1254 corresponding to the URL, without a user input. The processor 220 of the electronic device may control the display 260 such that a URL included in push information and/or another content included in the push information is displayed, instead of the icon 1252 indicating that the push information is received.

According to an embodiment, when a call termination event is detected, the electronic device (e.g., the processor 220) may display dynamic call information corresponding to a call-terminated state in operation 1213. For example, the processor 220 of the electronic device may control the display 260 to display an incoming call-terminated screen 730 including an epilogue image, a name, and a phone number, as illustrated in screen 730 of FIG. 7A. For example, the processor 220 of the electronic device may control the display 260 to display an outgoing call-terminated screen 760 including an epilogue image, a name, and a phone number, as illustrated in screen 760 of FIG. 7B. Dynamic call information corresponding to the call-terminated state may include a URL. When a URL is included in the dynamic call information corresponding to the call-terminated state, the processor 220 of the electronic device may control the display 260 to display the call-terminated screens 730 and 760 as illustrated in FIGS. 7A and 7B, respectively, and may control the display 260 to display a website screen corresponding to the URL in response to detecting a user input for at least one piece of information included in the call-terminated screens 730 and 760. For example, in the state in which a call-terminated screen 1260 including an epilogue image, a name, and a phone number is displayed, when a user input 1262 for the epilogue image is detected, as illustrated in FIG. 12C, the processor 220 of the electronic device may control the display 260 to display a website screen 1264 corresponding to the URL included in the dynamic call information corresponding to the call-terminated state. The processor 220 of the electronic device may store at least one piece of dynamic call information in a contact information database after a call is terminated. However, the point in time at which the dynamic call information is stored may not be limited. For example, the processor 220 of the electronic device may store at least one piece of dynamic call information at the point in time when the dynamic call information is obtained.

According to an embodiment, when a call connection event is not detected in operation 1203, the electronic device (e.g., the processor 220) may determine whether a call rejection event is detected (e.g. sensed) in operation 1215. For example, the processor 220 of the electronic device may detect a call rejection event, based on a user input. For example, the processor 220 of the electronic device may detect a call rejection event, based on a received signal indicating that a call connection is rejected.

According to an embodiment, when the call connection event and the call rejection event are not detected, the electronic device (e.g., the processor 220) may perform control such that dynamic call information corresponding to a call connection attempt state is continuously displayed in operation 1201.

According to an embodiment, when the call rejection event is detected, the electronic device (e.g., the processor 220) may terminate a procedure. However, dynamic call information of the partner electronic device may include dynamic call information corresponding to a call-rejected state. When the dynamic call information corresponding to the call-rejected state is included in the dynamic call information of the partner electronic device, the processor 220 of the electronic device may control the display 260 to display a call rejection screen including the dynamic call information corresponding to the call-rejected-state.

Figure 13:
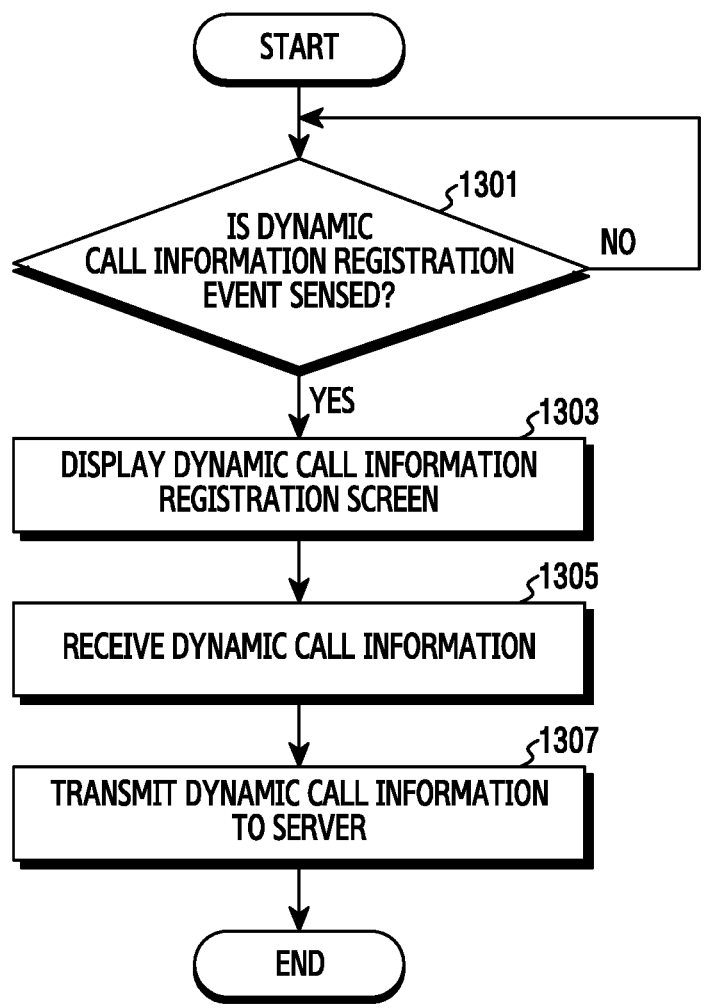
FIG. 13 is a flowchart of a process of registering dynamic call information by an electronic device according to an embodiment.

FIG. 13 is a flowchart of a process of registering dynamic call information by an electronic device according to an embodiment. Operations may be performed sequentially but are not required to be performed sequentially. For example, the order of the operations may be changed, and at least two operations may be performed in parallel. The electronic device may be the first electronic device 100, the second electronic device 102 of FIG. 1, or the electronic device 201 of FIG. 2.

Referring to FIG. 13, the electronic device (e.g., the processor 220) may determine whether a dynamic call information registration event is detected (e.g. sensed) in operation 1301. For example, the processor 220 of the electronic device may detect whether the dynamic call information registration event occurs based on a user input.

According to an embodiment, when the dynamic call information registration event is detected, the electronic device (e.g., the processor 220) may display a dynamic call information registration screen in operation 1303. For example, the processor 220 of the electronic device may control the display 260 to provide a user interface for registering dynamic call information for each call state. The user interface used for registering dynamic call information may include a user interface for registering dedicated-dynamic call information that is applied to a predetermined electronic device. The user interface used for registering dynamic call information may include at least one common-dynamic call information registration item and at least one dedicated-dynamic call information registration item. The user interface used for registering dynamic call information may include a user interface that requires input of information of a predetermined type. For example, the user interface used for registering dynamic call information may include a user interface that requires input of at least one of an incoming prologue image, an outgoing prologue image, a logo, an epilogue, a message, a phone number, and a name. An incoming prologue image size allowed for registration and an outgoing prologue image size allowed for registration may be different from each other.

According to an embodiment, the electronic device (e.g., the processor 220) may receive dynamic call information, based on a user input in operation 1305. For example, the processor 220 of the electronic device may receive dynamic call information corresponding to each call state via the dynamic call information registration screen displayed on a screen.

According to an embodiment, the electronic device (e.g., the processor 220) may transmit the dynamic call information based to a server in operation 1307. For example, the processor 220 of the electronic device may detect that input of the dynamic call information is completed based on a user input, and may control the communication interface 270 to transmit a dynamic call information registration signal including the input dynamic call information to the server.

Figure 14:
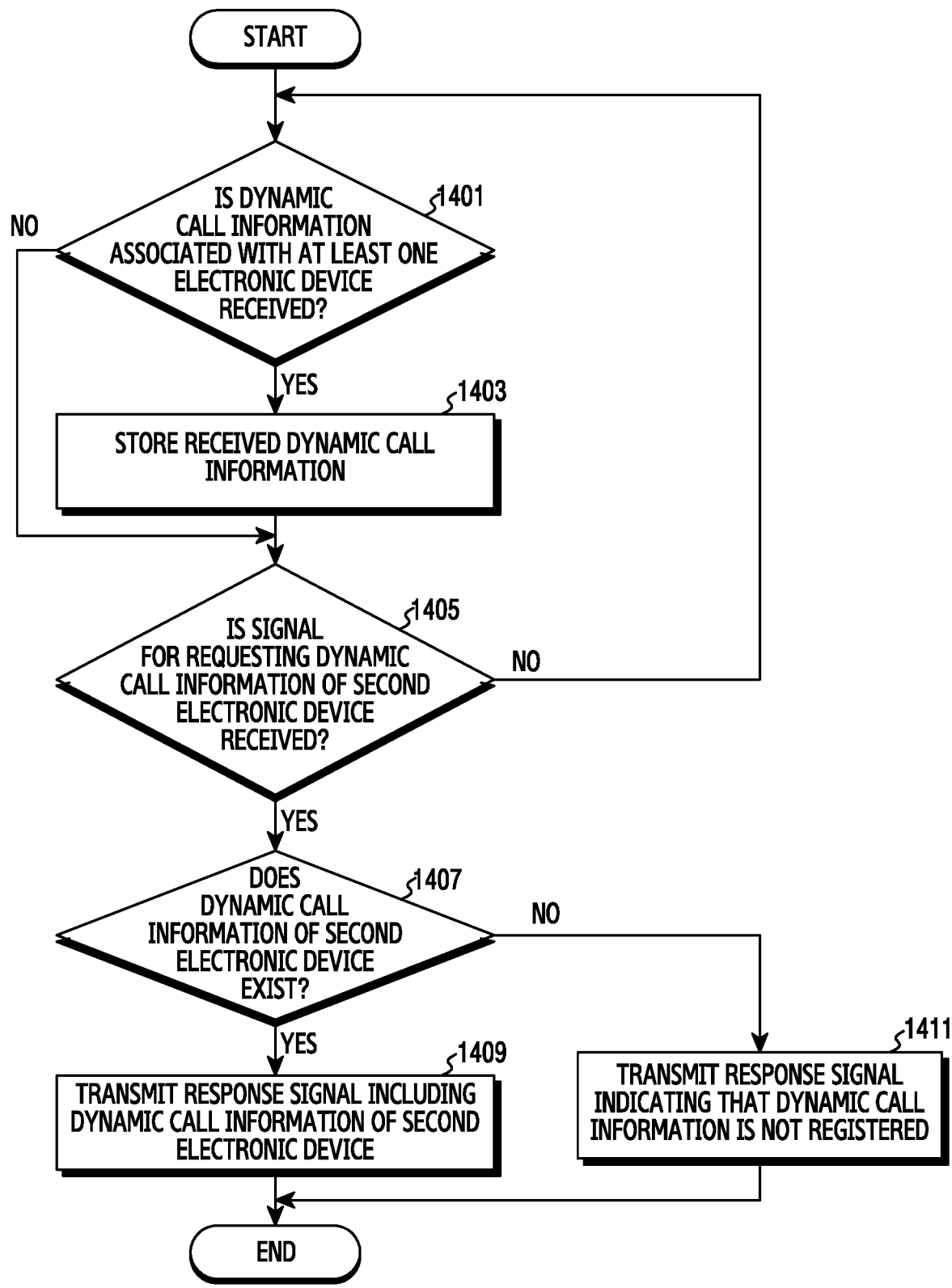
FIG. 14 is a flowchart of a process of providing dynamic call information by a first server according to an embodiment.

FIG. 14 is a flowchart of a process of providing dynamic call information by a first server according to an embodiment. Operations may be performed sequentially but are not required to be performed sequentially. For example, the order of the operations may be changed, and at least two operations may be performed in parallel. The first server may be the first server 104 of FIG. 1 or the server 501 of FIG. 5.

Referring to FIG. 14, the first server (e.g., the processor 520) may determine whether dynamic call information associated with at least one electronic device is received in operation 1401. For example, the processor 520 of the first server may determine whether dynamic call information associated with at least one electronic device is received from a second server via the communication interface 540. The second server may be the second server 108 of FIG. 1 or the server 501 of FIG. 5. According to an embodiment, the dynamic call information associated with at least one electronic device may be periodically received from the second server. The dynamic call information associated with at least one electronic device may be received from the second server in response to a request from the first server.

According to an embodiment, when the dynamic call information associated with the at least one electronic device is received, the first server (e.g., the processor 220) may store the received dynamic call information in operation 1403. The processor 520 of the first server may determine whether the dynamic call information associated with the at least one electronic device is stored in advance in a dynamic call information database. When previously stored dynamic call information associated with the at least one electronic device exists in the dynamic call information database, the processor 520 of the first server may delete the previously stored dynamic call information and store the received dynamic call information in the memory 530. For example, when previously stored common-dynamic call information associated with at least one electronic device exists in the dynamic call information database, and the received dynamic call information is common-dynamic call information, the processor 520 of the first server may delete the previously stored common-dynamic call information, and may store the received common-dynamic call information. When previously stored dynamic call information associated with the at least one electronic device exists in the dynamic call information database, the processor 520 of the first server may additionally store the received dynamic call information in addition to the previously stored dynamic call information. For example, when previously stored common-dynamic call information associated with at least one electronic device exists in the dynamic call information database, and the received dynamic call information is dedicated-dynamic call information, the processor 520 of the first server may keep the previously stored common-dynamic call information, and may additionally store the dedicated-dynamic call information. The processor 520 of the first server may store the received dynamic call information, irrespective of the storage characteristic of the dynamic call information. The processor 520 of the first server may add the identification information associated with at least one electronic device to a list indicating electronic devices that subscribe to the dynamic call information display service.

According to an embodiment, the first server (e.g., the processor 220) may determine whether a signal for requesting dynamic call information of a second electronic device is received in operation 1405. For example, the processor 520 of the first server may determine whether a signal for requesting transmission of dynamic call information associated with the second electronic device is received from a first electronic device via the communication interface 540. The signal for requesting the dynamic call information of the second electronic device may include identification information of the second electronic device. When the signal for requesting the dynamic call information of the second electronic device is not received, the processor 520 of the first server may determine whether dynamic call information associated with at least one electronic device is received in operation 1401. The signal for requesting the dynamic call information of the second electronic device may include a signal for inquiring about whether the second electronic device subscribes to a dynamic call information display service.

According to an embodiment, when the signal for requesting the dynamic call information of the second electronic device is received, the first server (e.g., the processor 220) may determine whether the dynamic call information of the second electronic device exists in operation 1407. For example, the processor 520 of the first server may obtain the identification information of the second electronic device included in the signal for requesting the dynamic call information. The processor 520 of the first server may determine whether the dynamic call information of the second electronic device exists, based on whether dynamic call information corresponding to the obtained identification information is retrieved.

According to an embodiment, when the dynamic call information of the second electronic device exists, the first server (e.g., the processor 220) may transmit a response signal including the dynamic call information of the second electronic device in operation 1409. For example, when the dynamic call information corresponding to the obtained identification information is retrieved, the processor 520 of the first server may control the communication interface 540 to transmit a response signal including the retrieved dynamic call information to the first electronic device that transmits the signal for requesting the dynamic call information of the second electronic device. The response signal may include at least a part of common-dynamic call information of the second electronic device and at least a part of dedicated-dynamic call information. For example, when the common-dynamic call information includes a first incoming prologue image, a first outgoing prologue image, a first logo, a first epilogue, a first message, a first phone number, and a first name, and the dedicated-dynamic call information includes a second incoming prologue image, a second message, and a second phone number, the processor 520 of the first server may control the communication interface 540 to transmit a response signal including the second incoming prologue image, the first outgoing prologue image, the first logo, the first epilogue, the second message, the second phone number, and the first name to the first electronic device.

According to an embodiment, when the dynamic call information of the second electronic device does not exist, the first server (e.g., the processor 220) may transmit a response signal indicating that the dynamic call information of the second electronic device is not registered in operation 1411. For example, when the dynamic call information corresponding to the obtained identification information is not retrieved, the processor 520 of the first server may control the communication interface 540 to transmit a response signal indicating that the dynamic call information of the second electronic device is not registered in the server to the first electronic device that transmits the signal for requesting the dynamic call information of the second electronic device. The response signal may include information indicating that the second electronic device does not subscribe to the dynamic call display service.

Figure 15:
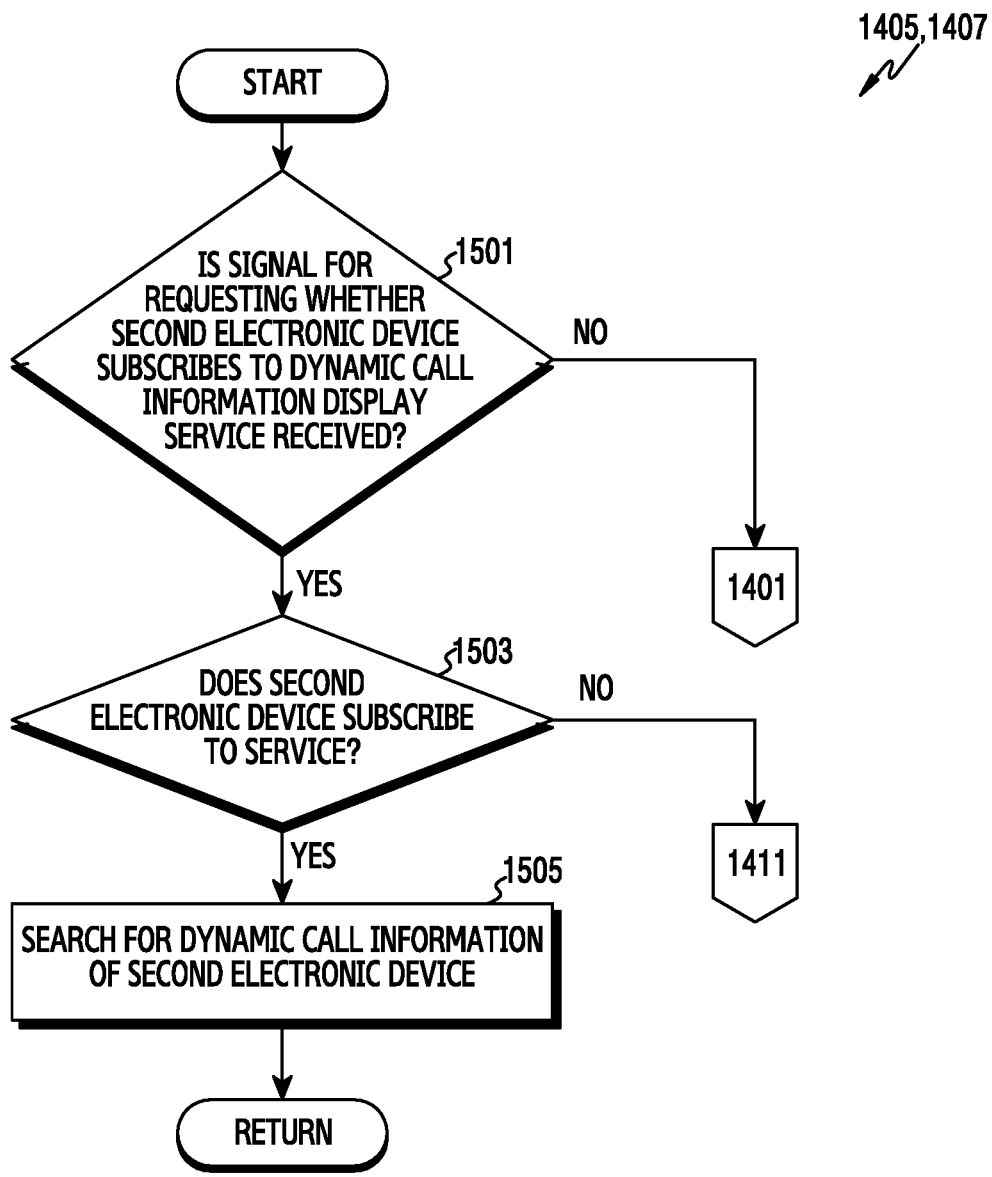
FIG. 15 is a flowchart of a process of searching for dynamic call information by a first server according to an embodiment.

FIG. 15 is a flowchart of a process of searching for dynamic call information by a first server according to an embodiment. Operations 1405 and 1407 of FIG. 14 are described below in greater detail. Operations may be performed sequentially but are not required to be performed sequentially. For example, the order of the operations may be changed, and at least two operations may be performed in parallel. The first server may be the first server 104 of FIG. 1 or the server 501 of FIG. 5.

Referring to FIG. 15, the first server (e.g., the processor 520) may determine whether a signal for inquiring about (e.g. requesting) whether a second electronic device subscribes to a dynamic call information display service is received in operation 1501. The signal for inquiring about whether the second electronic device subscribes to the dynamic call information display service may include, for example, information for inquiring about whether the second electronic device is an electronic device that subscribes to the dynamic call information display service, and information for requesting transmission of dynamic call information when the second electronic device is the electronic device that subscribes to the dynamic call information display service.

According to an embodiment, the first server (e.g., the processor 220) may determine whether the second electronic device subscribes to the dynamic call information display service in operation 1503. For example, the processor 520 of the first server may check whether identification information of the second electronic device exists in a list of electronic devices that subscribe to the dynamic call information display service, to determine whether the second electronic device subscribes to the dynamic call information display service.

According to an embodiment, when it is identified that the second electronic device subscribes to the dynamic call information display service, the first server (e.g., the processor 220) may search for the dynamic call information of the second electronic device in operation 1505. The processor 520 of the first server may search for the dynamic call information of the second electronic device from a dynamic call information database of the first server. The processor 520 of the first server may search for the dynamic call information of the second electronic device from a dynamic call information database of a second server. For example, the processor 520 of the first server may request the dynamic call information of the second electronic device from the second server via the communication interface 540, and may receive the dynamic call information of the second electronic device from the second server.

Figure 16:
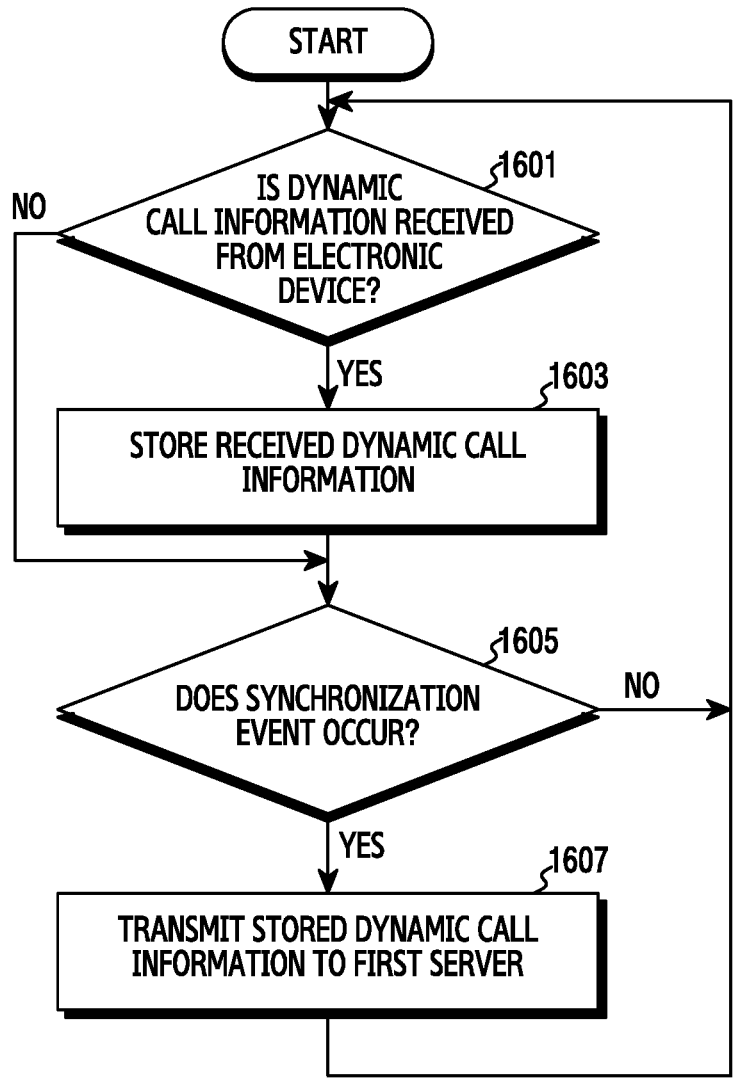
FIG. 16 is a flowchart of a process of managing dynamic call information by a second server according to an embodiment.

FIG. 16 is a flowchart of a process of managing dynamic call information by a second server according to an embodiment. Operations may be performed sequentially but are not required to be performed sequentially. For example, the order of the operations may be changed, and at least two operations may be performed in parallel. The second server may be the second server 108 of FIG. 1 or the server 501 of FIG. 5.

Referring to FIG. 16, the second server (e.g., the processor 520) may determine whether dynamic call information is received from an electronic device in operation 1601. According to an embodiment, the processor 520 of the second server may receive a dynamic call information registration request message including dynamic call information from at least one electronic device via the communication interface 540. The processor 520 of the second server may receive a dynamic call information registration request message including dedicated-dynamic call information which sets a predetermined electronic device as a target, from at least one electronic device via the communication interface 540.

According to an embodiment, when dynamic call information is received from an electronic device, the second server (e.g., the processor 220) may store the received dynamic call information in operation 1603. The processor 520 of the second server may determine whether dynamic call information associated with the corresponding electronic device is stored in advance in a dynamic call information database. When previously stored dynamic call information associated with the corresponding electronic device exists in the dynamic call information database, the processor 520 of the second server may delete the previously stored dynamic call information and store the received dynamic call information. For example, when previously stored common-dynamic call information associated with the corresponding electronic device is stored in the dynamic call information database, and the received dynamic call information is common-dynamic call information, the processor 520 of the second server may delete the previously stored common-dynamic call information, and may store the received common-dynamic call information. When previously stored dynamic call information associated with the corresponding electronic device exists in the dynamic call information database, the processor 520 of the second server may additionally store the received dynamic call information in addition to the previously stored dynamic call information. For example, when previously stored common-dynamic call information associated with the corresponding electronic device exists in the dynamic call information database, and the received dynamic call information is dedicated-dynamic call information, the processor 520 of the second server may keep the previously stored common-dynamic call information, and may additionally store the dedicated-dynamic call information. The processor 520 of the second server may store the received dynamic call information, irrespective of the storage characteristic of the dynamic call information. The second server may add identification information associated with the corresponding electronic device to a list indicating electronic devices that subscribe to the dynamic call information display service.

According to an embodiment, the second server (e.g., the processor 220) may detect whether a synchronization event occurs in operation 1605. The processor 520 of the second server may detect that a synchronization event occurs every time that a predetermined synchronization period lapses.

The processor 520 of the second server may detect that a synchronization event occurs based on a request from the first server. For example, when at least one piece of dynamic call information is requested by the first server, the processor 520 of the second server may detect that a synchronization event occurs.

According to an embodiment, when the occurrence of a synchronization event is detected, the second server (e.g., the processor 220) may transmit stored synchronization call information to the first server in operation 1607. The processor 520 of the second server may control the communication interface 540 such that the entirety or a part of the dynamic call information stored in the dynamic call information database of the second server is transmitted to the first server. The processor 520 of the second server may control the communication interface 540 such that the dynamic call information of all electronic devices stored in the dynamic call information database of the second server are transmitted to the first server. The processor 520 of the second server may control the communication interface 540 such that the dynamic call information of some electronic devices stored in the dynamic call information database of the second server are transmitted to the first server. For example, the processor 520 of the second server may obtain identification information associated with at least one electronic device from a dynamic call information request signal received from the first server via the communication interface 540, and may transmit, to the first server, dynamic call information of the electronic device corresponding to the obtained identification information.

Figure 17:
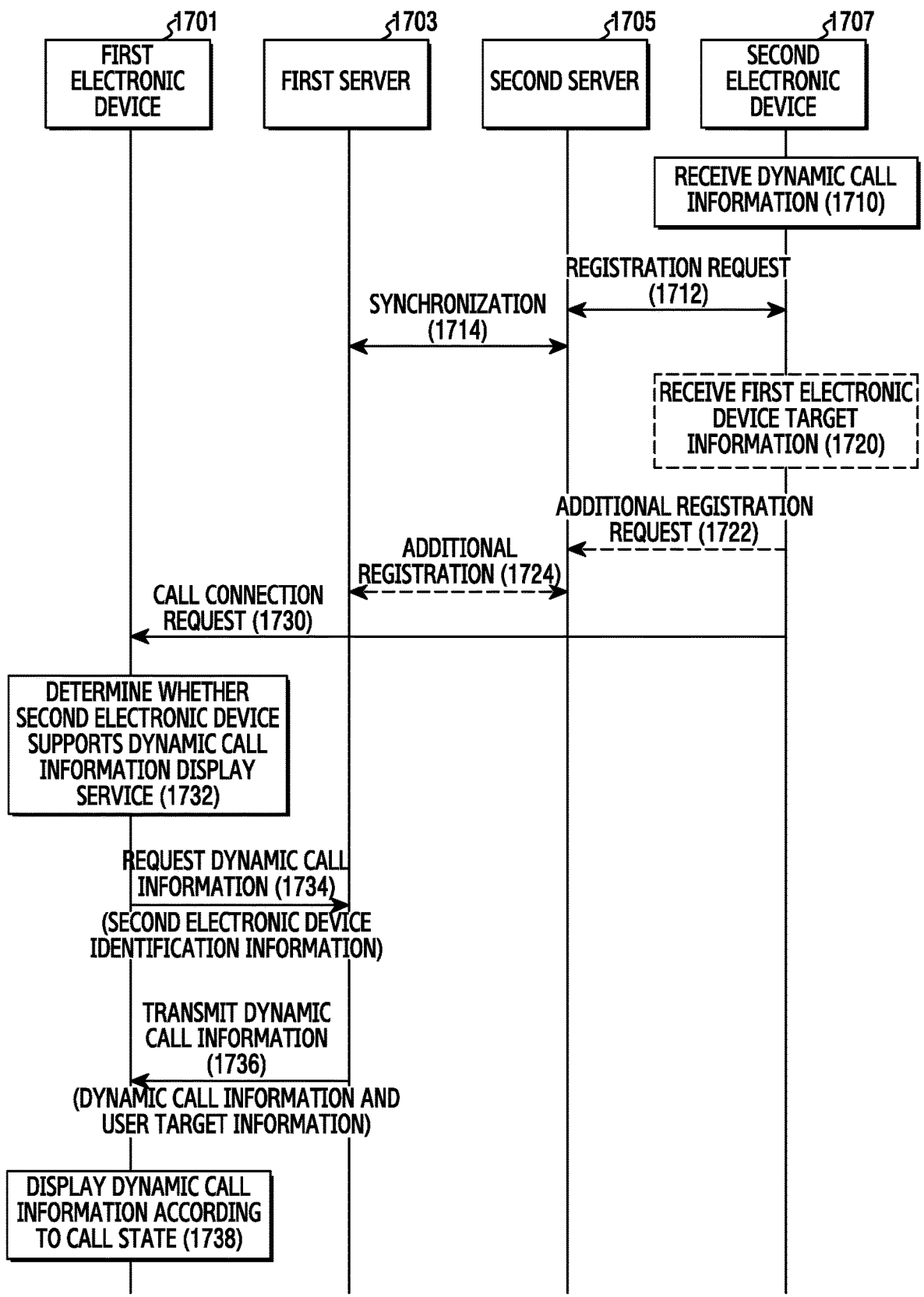
FIG. 17 is a flow diagram of a process of providing a dynamic call information display service associated with an incoming call by a system according to an embodiment.

FIG. 17 is a flow diagram of a process of providing a dynamic call information display service associated with an incoming call by a system according to an embodiment. Operations may be performed sequentially but are not required to be performed sequentially. For example, the order of the operations may be changed, and at least two operations may be performed in parallel. The operations expressed as broken lines in FIG. 17 may be omitted.

Referring to FIG. 17, a second electronic device 1707 may receive dynamic call information, based on a user input in operation 1710. For example, the second electronic device 1707 may detect a dynamic call information registration event, based on a user input, and may provide a user interface for registering dynamic call information. The second electronic device 1707 may receive dynamic call information from a user via the user interface used for registering dynamic call information. According to an embodiment, the dynamic call information received in operation 1710 may include common-dynamic call information that is commonly applied to a plurality of electronic devices.

According to an embodiment, the second electronic device 1707 may transmit a signal for requesting registration of dynamic call information to a second server 1705 in operation 1712. For example, the second electronic device 1707 may transmit, to the second server 1705, a dynamic call information registration request signal including the dynamic call information received based on the user input.

According to an embodiment, the second server 1705 that receives the dynamic call information registration request signal from the second electronic device 1707 may store the dynamic call information included in the received dynamic call information registration request signal, and may synchronize the dynamic call information with the first server 1703 in operation 1714. For example, the second server 1705 may transmit the dynamic call information stored in the second server 1705 to the first server 1703. The synchronization of the dynamic call information may be performed at predetermined intervals, and may be performed by a request from the first server 1703.

According to an embodiment, the second electronic device 1707 may receive, based on a user input, dynamic call information that sets a first electronic device 1701 as a target in operation 1720. For example, the second electronic device 1707 may detect, based on a user input, a dedicated-dynamic call information registration event which sets the first electronic device 1701 as a target, and may provide a user interface for registering dedicated-dynamic call information. The second electronic device 1707 may receive dedicated-dynamic call information associated with the first electronic device 1701 via the user interface used for registering dedicated-dynamic call information.

According to an embodiment, the second electronic device 1707 may transmit, to the second server 1705, a signal for requesting additional registration of dynamic call information that sets the first electronic device 1701 as a target in operation 1722. For example, the second electronic device 1707 may transmit, to the second server 1705, a signal for requesting additional recognition of dynamic call information including the dedicated-dynamic call information received based on the user input.

According to an embodiment, the second server 1705 may receive the additional registration request signal associated with dedicated-dynamic call information that sets the first electronic device 1701 as a target, and may request, from the first server 1703, additional registration of the dedicated-dynamic call information that sets the first electronic device 1701 as a target in operation 1724. Before requesting additional registration of the dedicated-dynamic call information, the second server 1705 may transmit, to the first server 1703, a signal for inquiring about whether the first electronic device 1701 subscribes to a dynamic call information display service. The first server 1703 may determine whether the first electronic device 1701 subscribes to the dynamic call information display service, and may transmit, to the second server 1705, a response signal indicating identified information associated with subscription to the dynamic call information display service. Based on the response signal received from the first server 1703, when it is identified that the first electronic device 1701 subscribes to the dynamic call information display service, the second server 1705 may request, from the first server 1703, additional registration of the dedicated-dynamic call information that sets the first electronic device 1701 as a target. Based on the response signal received from the first server 1703, when it is identified that the first electronic device 1701 does not subscribe to the dynamic call information display service, the second server 1705 may not request additional registration from the first server 1703, and may transmit, to the second electronic device 1707, a response signal indicating that the additional registration of the dedicated-dynamic call information is not allowed. The response signal indicating that the additional registration of the dedicated-dynamic call information is not allowed may include information indicating that the first electronic device 1701 does not subscribe to the dynamic call information display service.

In response to the request for the additional registration of the dedicated-dynamic call information that sets the first electronic device 1701 as a target, the second server 1705 may receive a signal indicating whether the first electronic device 1701 subscribes to the dynamic call information display service from the first server 1703. For example, when the additional registration of the dedicated-dynamic call information that sets the first electronic device 1701 as a target is requested by the second server 1705, the first server 1703 may determine whether the first electronic device 1701 subscribes to the dynamic call information display service. When it is identified that the first electronic device 1701 subscribes to the dynamic call information display service, the first server 1703 may store the dedicated-dynamic call information received from the second server 1705. The first server 1703 may transmit, to the second server 1705, a response signal including at least one of information indicating that the first electronic device 1701 subscribes to the dynamic call information display service and information indicating that additional registration of the dedicated-dynamic call information is completed. When it is identified that the first electronic device 1701 does not subscribe to the dynamic call information display service, the first server 1703 may transmit, to the second server 1705, a response signal including at least one of information indicating that the first electronic device 1701 does not subscribe to the dynamic call information display service and information indicating that the additional registration of the dedicated-dynamic call information is not allowed. The second server 1705 may transmit a response signal indicating whether the additional registration of the dedicated-dynamic call information is successfully performed to the second electronic device 1707.

According to an embodiment, the second electronic device 1707 may transmit a call connection request signal to the first electronic device 1701 in operation 1730. For example, based on a user input, the second electronic device 1707 may detect that an outgoing call event associated with the first electronic device 1701 occurs, and may transmit a call connection request signal to the first electronic device 1701.

According to an embodiment, the first electronic device 1701 that receives the call connection request signal from the second electronic device 1707 may determine whether the second electronic device 1707 supports a dynamic call information display service in operation 1732. According to an embodiment, the first electronic device 1701 may determine whether the second electronic device supports the dynamic call information display service, based on information previously stored in a contact information database of the first electronic device 1701. The first electronic device 1701 inquires of the first server 1703 about whether the second electronic device supports the dynamic call information display service, and may receive, from the first server 1703, a response signal indicating whether the second electronic device supports the dynamic call information display service. The following operation is described under the assumption that the second electronic device 1707 supports the dynamic call information display service.

According to an embodiment, when it is identified that the second electronic device 1707 supports the dynamic call information display service, the first electronic device 1707 may transmit, to the first server 1703, a dynamic call information request signal including identification information of the second electronic device 1707 in operation 1734.

According to an embodiment, the first server 1703 that receives the dynamic call information request signal from the first electronic device 1701 may transmit, to the first electronic device 1701, a signal including dynamic call information associated with the second electronic device 1707 in operation 1736. The signal including the dynamic call information associated with the second electronic device 1707 may include common-dynamic call information and dedicated-dynamic call information that sets the first electronic device 1701 as a target. The first server 1703 may transmit both the dedicated-dynamic call information and the common-dynamic call information of the second electronic device 1707 to the first electronic device 1701. The first server 1703 may select and transmit at least some of the common-dynamic call information and at least some of the dedicated-dynamic call information of the second electronic device 1707, based on a call event type of the first electronic device 1701 and information indicating whether dedicated-dynamic call information that sets the first electronic device 1701 as a target exists. For example, when the common-dynamic call information includes a first incoming prologue image, a first outgoing prologue image, a first logo, a first epilogue, a first message, a first phone number, and a first name, and the dedicated-dynamic call information includes a second incoming prologue image, a second message, and a second phone number, the first server may transmit a response signal including the second incoming prologue image, the first logo, the first epilogue, the second message, the second phone number, and the first name to the first electronic device. The call event type may include an incoming call event and an outgoing call event.

According to an embodiment, the first electronic device 1701 may display dynamic call information according to a call state in operation 1738. For example, the first electronic device 1701 may operate as in operations 605 and 607 of FIG. 6.

The description above of FIG. 17 is a case in which the second electronic device 1707 registers common-dynamic call information in the second server 1705, and then registers dedicated-dynamic call information in the second server 1705. However, according to an embodiment, the second electronic device 1707 may register the common-dynamic call information and the dedicated-dynamic call information together in the sever 1705. For example, the second electronic device 1707 may provide a user interface for registering common-dynamic call information and a user interface for registering dedicated-dynamic call information on a single screen. The second electronic device 1707 may transmit, to the server 1705, a dynamic call information registration request signal that includes the common-dynamic call information and the dedicated-dynamic call information which are input via a single screen. For example, the second electronic device 1707 may successively display, based on a user input, a screen for providing a user interface for registering common-dynamic call information and a screen for providing a user interface for registering dedicated-dynamic call information. The second electronic device 1707 may transmit, to the server 1705, a dynamic call information registration request signal that includes the common-dynamic call information and the dedicated-dynamic call information which are input via successively displayed screens.

The first electronic device 1701 may register dynamic call information before transmitting a call connection request signal to the second electronic device. For example, the dynamic call information of the first electronic device 1701 may be registered in the first server 1703 in the same manner as in operations 1710, 1712, and 1714.

Figure 18:
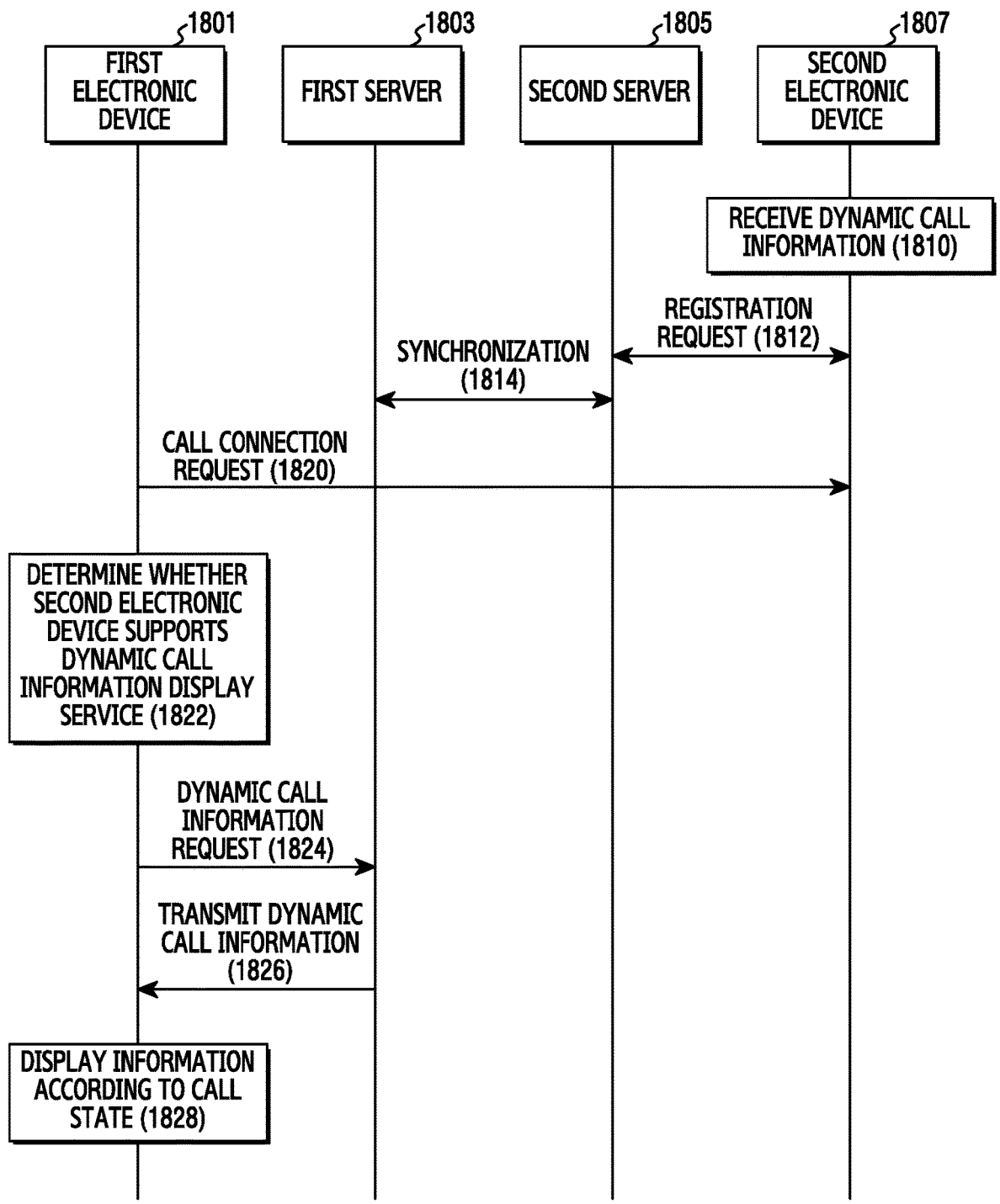
FIG. 18 is a signal flow diagram of a process of providing a dynamic call information display service associated with an outgoing call by a system according to an embodiment.

FIG. 18 is a flow diagram of a process of providing a dynamic call information display service associated with an outgoing call by a system according to an embodiment. Operations may be performed sequentially but are not required to be performed sequentially. For example, the order of the operations may be changed, and at least two operations may be performed in parallel.

Referring to FIG. 18, operations 1810, 1812, and 1814 a second electronic device 1807 receiving dynamic call information, the second electronic device 1807 requesting registration with a second server 1805, and the second server 1805 synchronizing with a first server 1803, respectively, are performed in the same manner as in operations 1710, 1712, and 1714 of FIG. 17, and thus, descriptions of operations 1810, 1812, and 1814 are omitted below.

According to an embodiment, a first electronic device 1801 may transmit a call connection request signal to the second electronic device 1807 in operation 1820. For example, based on a user input, the first electronic device 1801 may detect an outgoing call event associated with the second electronic device 1807, and may transmit a call connection request signal to the second electronic device 1807.

According to an embodiment, the first electronic device 1801 may determine whether the second electronic device 1807 supports a dynamic call information display service in operation 1822. The first electronic device 1801 may determine whether the second electronic device 1807 supports the dynamic call information display service, based on information previously stored in a contact information database of the first electronic device 1801. The first electronic device 1801 inquires of a first server 1803 about whether the second electronic device 1807 supports the dynamic call information display service, and may receive, from the first server 1803, a response signal indicating whether the second electronic device 1807 supports the dynamic call information display service. The following operation is described under the assumption that the second electronic device 1807 supports the dynamic call information display service.

According to an embodiment, when it is identified that the second electronic device 1807 supports the dynamic call information display service, the first electronic device 1801 may transmit, to the first server 1803, a dynamic call information request signal including identification information of the second electronic device 1807 in operation 1824.

According to an embodiment, the first server 1803 that receives the dynamic call information request signal from the first electronic device 1801 may transmit, to the first electronic device 1801, a signal including dynamic call information associated with the second electronic device 1807 in operation 1826. The signal including the dynamic call information associated with the second electronic device 1807 may include common-dynamic call information.

According to an embodiment, the first electronic device 1801 may display dynamic call information according to a call state in operation 1838. For example, the first electronic device 1801 may operate as shown in operations 605 and 607 of FIG. 6.

The first electronic device 1801 may register common-dynamic call information and dedicated-dynamic call information that sets the second electronic device 1807 as a target, before transmitting the call connection request signal to the second electronic device. The common-dynamic call information and dedicated-dynamic call information of the first electronic device 1801 may be registered in the first server 1803 in the same manner as in operations 1710, 1712, 1714, 1720, 1722, and 1724 of FIG. 17.

Figure 19:
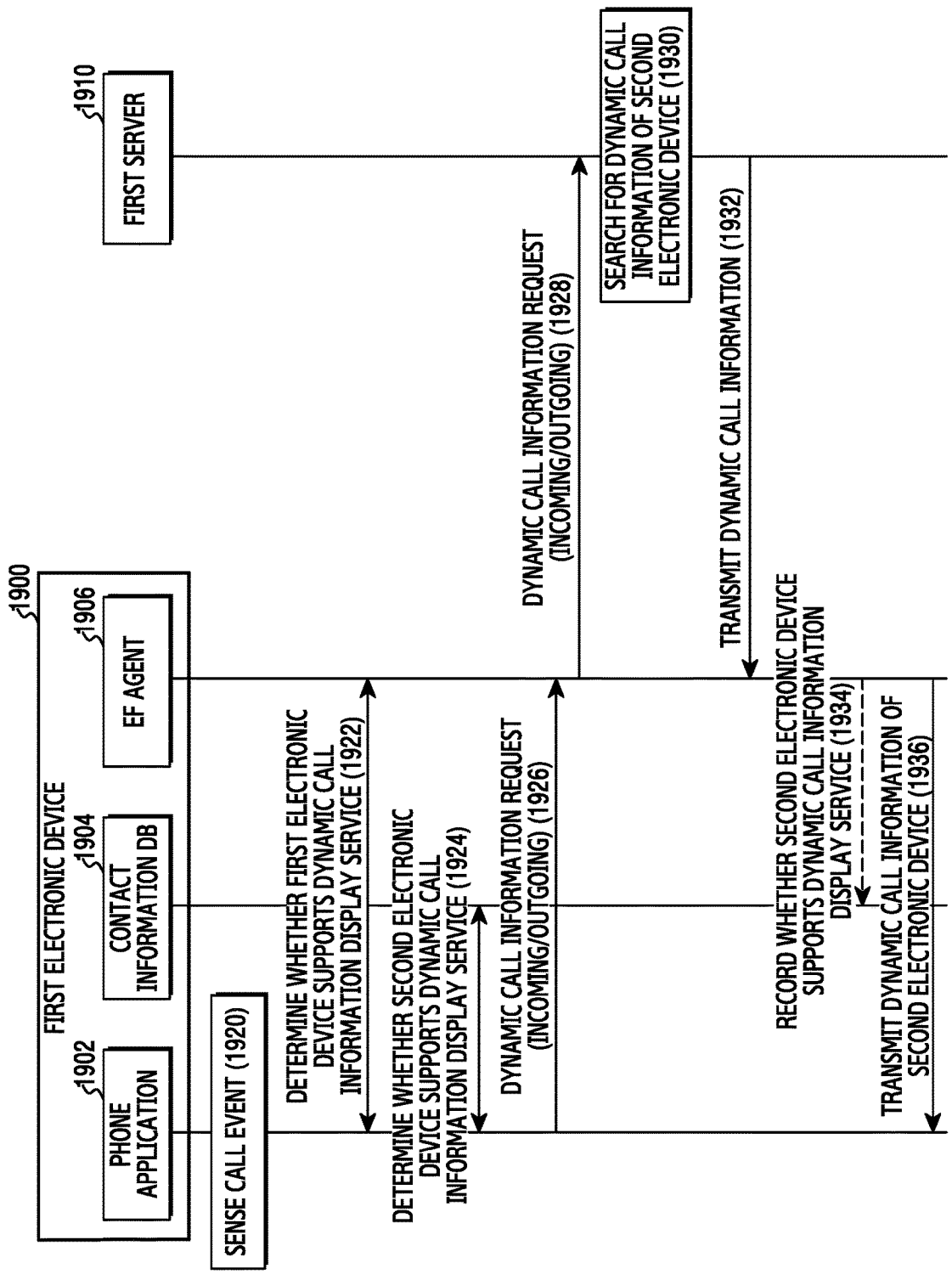
FIG. 19 is a signal flow diagram of a process of providing a dynamic call information display service by an electronic device according to an embodiment.

FIG. 19 is a flow diagram of a process of providing a dynamic call information display service by an electronic device according to an embodiment. Operations may be performed sequentially but are not required to be performed sequentially. For example, the order of the operations may be changed, and at least two operations may be performed in parallel.

Referring to FIG. 19, a first electronic device 1900 may include a phone application 1902, a contact information DB 1904, and an EF agent (or EF manager) 1906. The contact information DB 1904 may be an application that includes a database including contact information, and controls and manages the database.

According to an embodiment, the phone application 1902 of the first electronic device 1900 may detect (e.g. sense) a call event associated with a second electronic device in operation 1920. For example, the phone application may detect that an outgoing call event or an incoming call event occurs.

According to an embodiment, in operation 1922, the phone application 1902 of the first electronic device 1900 may communicate with the EF agent 1906 to determine whether the first electronic device 1900 supports a dynamic call information display service. For example, the phone application 1902 may transmit, to the EF agent 1906, a signal for inquiring about whether the second electronic device 1900 subscribes to the dynamic call information display service, and may receive, from the EF agent 1906, a response signal indicating that the second electronic device 1900 subscribes to the dynamic call information display service. The description below is provided under the assumption that the first electronic device 1900 supports the dynamic call information display service.

According to an embodiment, in operation 1924, the phone application 1902 that identifies that the first electronic device 1900 supports the dynamic call information display service may communicate with the contact information DB 1904 to determine whether a second electronic device supports the dynamic call information display service in operation 1924. For example, the phone application 1902 may identify information indicating whether the second electronic device supports the dynamic call information display service in the contact information DB 1904. The information indicating whether the second electronic device supports the dynamic call information display service may be stored in the contact information DB 1904 according to a contact information update procedure associated with the second electronic device, which is described below in greater detail with reference to FIG. 20. The description below is provided under the assumption that contact information of the second electronic device and information indicating that the second electronic device supports the dynamic call information display service are stored in the contact information DB 1904. However, contact information corresponding to the second electronic device may not exist in the contact information DB 1904, or information indicating whether the second electronic device supports the dynamic call information display service may not exist. In this case, the phone application 1902 of the first electronic device 1900 may request the EF agent 1906 to determine whether the second electronic device subscribes to the dynamic call information display service. The EF agent 1906 inquires of the first server 1910 about whether the second electronic device subscribes to the dynamic call information display service, and may receive, from the first server 1910, a response signal indicating whether the second electronic device supports the dynamic call information display service.

According to an embodiment, the phone application 1902 that identifies that the first electronic device 1900 and the second electronic device support the dynamic call information display service may transmit, to the EF agent 1906, a signal for requesting dynamic call information in operation 1926. The signal for requesting the dynamic call information may include call event type information. For example, the signal for requesting the dynamic call information may include information indicating whether the call event detected in operation 1920 is an outgoing call event or an incoming call event.

According to an embodiment, the EF agent 1906 of the first electronic device 1900 may transmit, to the first server 1910, the signal for requesting dynamic call information in operation 1928. The signal for requesting the dynamic call information may include identification information of the second electronic device. The signal for requesting the dynamic call information may include the identification information of the second electronic device and call event type information.

According to an embodiment, the first server 1910 may search for the dynamic call information of the second electronic device in operation 1930. For example, the first server 1910 may search for dynamic call information corresponding to identification information of the second electronic device. The dynamic call information may include at least one of common-dynamic call information and dedicated-dynamic call information that sets the first electronic device 1900 as a target.

According to an embodiment, the first server 1910 may transmit the retrieved dynamic call information to the first electronic device 1900 in operation 1932. The first server 1910 may transmit the entirety or at least some of the dynamic call information of the second electronic device to the first electronic device 1900. For example, the first server 1910 may transmit, to the first electronic device 1900, both the common-dynamic call information of the second electronic device and the dedicated-dynamic call information of the second electronic device which sets the first electronic device 1900 as a target. For example, the first server 1910 may transmit, to the first electronic device 1900, at least some of the common-dynamic call information of the second electronic device and at least some of the dedicated-dynamic call information that sets the first electronic device 1900 as a target. For example, the first server 1910 may transmit, to the first electronic device 1900, information corresponding to an event type from among information included in the dynamic call information of the second electronic device.

According to an embodiment, the EF agent 1906 of the first electronic device 1900 may receive dynamic call information of the second electronic device from the first server 1910, and may record information indicating that the second electronic device supports the dynamic call information display service in the contact information DB 1904 in operation 1934. For example, when contact information of the second electronic device exists in the contact information DB 1904, the EF agent 1906 may store information indicating that the second electronic device supports the dynamic call information display service in the contact information DB 1904. For example, when the contact information of the second electronic device does not exist in the contact information DB 1904, the EF agent 1906 may omit operation 1934.

According to an embodiment, the EF agent 1906 of the first electronic device 1900 may transmit, to phone application 1902, the dynamic call information of the second electronic device in operation 1936. The phone application 1902 may display dynamic call information according to a call state with the second electronic device on a screen, based on the obtained dynamic call information. For example, the first electronic device 1900 may operate as in operations 605 and 607 of FIG. 6, or may operate as shown in FIG. 12A.

Figure 20:
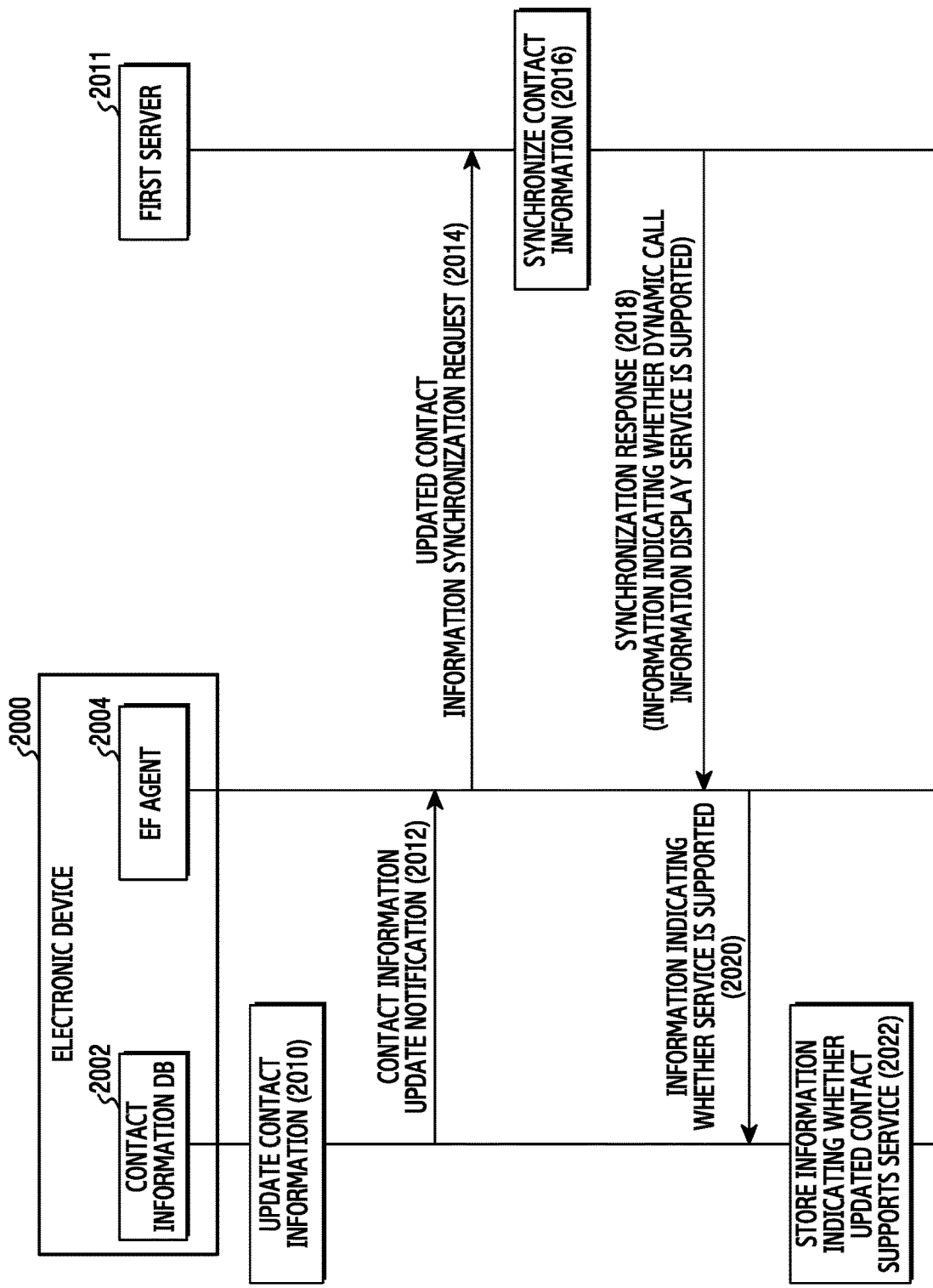
FIG. 20 is a signal flow diagram of a process of synchronizing contact information by an electronic device according to an embodiment.

FIG. 20 is a flow diagram of a process of synchronizing contact information by an electronic device according to an embodiment. Operations may be performed sequentially but are not required to be performed sequentially. For example, the order of the operations may be changed, and at least two operations may be performed in parallel.

Referring to FIG. 20, a first electronic device 2000 may include a contact information DB manager 2002 and an EF agent (or EF manager) 2004. The contact information DB manager 2002 may be an application that include a database including contact information, and controls and manages the database.

According to an embodiment, the contact information DB manager 2002 of the electronic device 2000 may determine whether contact information is updated in operation 2010. For example, the contact information DB manager 2002 may determine whether contact information (or user profile information) associated with at least one other electronic device included in a contact information database is added, changed, or deleted.

According to an embodiment, when the contact information associated with another electronic device is updated, the contact information DB manager 2002 may transmit a signal indicating (e.g. notifying) that contact information associated with the other electronic device is updated to the EF agent 2004 in operation 2012. For example, the contact information DB manager 2002 may transmit, to the EF agent 2004, a signal including identification information of the other electronic device corresponding to the updated contact information and information associated with updated content. For example, when a phone number and a name of a second electronic device are added to the contact information database, the contact information DB manager 2002 may transmit a signal including the phone number and name information of the second electronic device to the EF agent 2004. For example, in a state in which the phone number, the name, and the address information of the second electronic device are stored in the contact information database, when the address information of the second electronic device is corrected, the contact information DB manager 2002 may transmit a signal including the phone number of the second electronic device and changed address information to the EF agent 2004.

According to an embodiment, the EF agent 2004 that receives a contact information update notification signal from the contact information DB manager 2002 may transmit, to a first server 2011, a signal for requesting synchronization of the updated contact information in operation 2014. For example, the EF agent 2004 may transmit a signal including identification information of the other electronic device corresponding to the updated contact information and information associated with updated content to the first server 2011.

According to an embodiment, the first server 2011 may synchronize, based on the received signal, the contact information in operation 2016. For example, the first server 2011 may update contact information (or user profile information) stored in the first server 2011, based on information included in the signal for requesting the synchronization of the updated contact information.

According to an embodiment, the first server 2011 may transmit a synchronization response signal to the electronic device 2000 in operation 2018. The synchronization response signal may include information indicating that synchronization of updated contact information is completed, and information indicating whether the other electronic device corresponding to the updated contact information supports the dynamic call information display service. For example, when the contact information of the second electronic device is synchronized based on the signal received from the electronic device 2000, the first server 2011 may check whether identification information of the second electronic device exists in a list of electronic devices that subscribe to the dynamic call information display service. When the identification information of the second electronic device exists in the list of electronic devices that subscribe to the dynamic call information display service, the first server 2011 may transmit, to the electronic device 2000, a response signal including information indicating that the second electronic device supports the dynamic call information display service. When the identification information of the second electronic device does not exist in the list of electronic devices that subscribe to the dynamic call information display service, the first server 2011 may transmit, to the electronic device 2000, a response signal including information indicating that the second electronic device does not support the dynamic call information display service.

According to an embodiment, the EF agent 2004 of the electronic device 2000 may transmit, to the contact information DB manager 2002, information indicating whether the other electronic device corresponding to the updated contact information supports the dynamic call information display service in operation 2020. The contact information DB manager 2002 of the electronic device 2000 may store information indicating whether the other electronic device corresponding to the updated contact information supports the dynamic call information display service in operation 2022. For example, the contact information DB manager 2002 may map the information indicating whether the other electronic device supports the dynamic call information display service onto identification information of the other electronic device, and may store the same.

Figure 21:
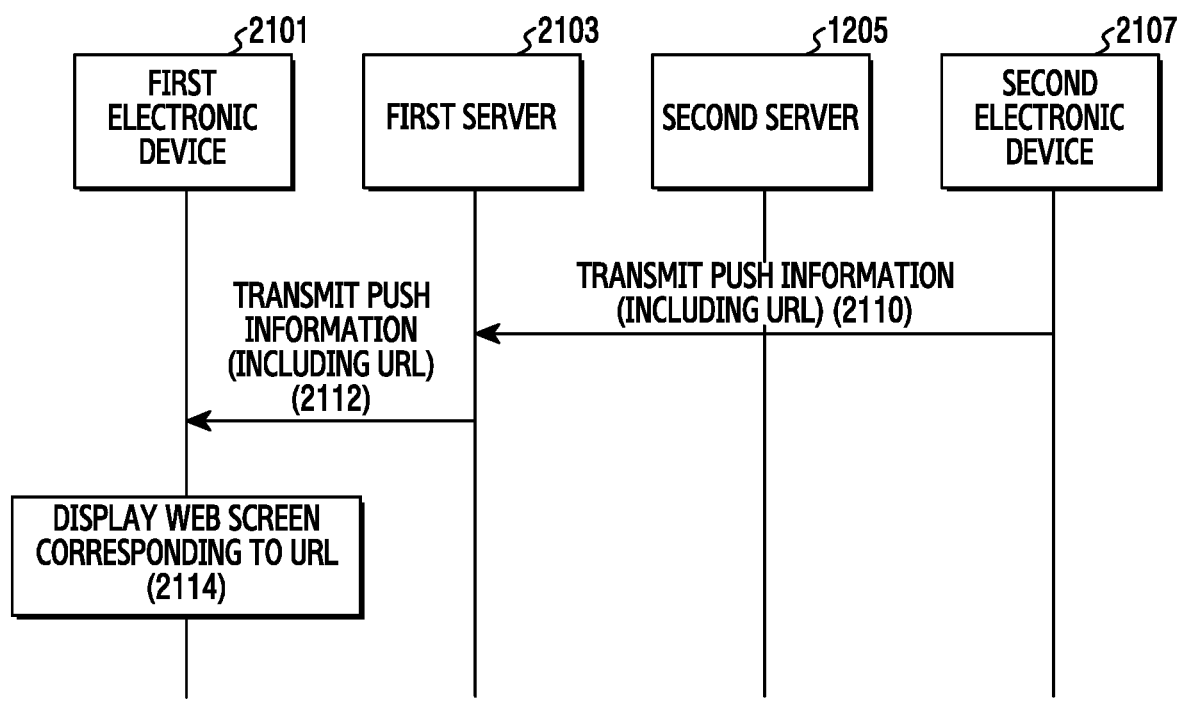
FIG. 21 is a signal flow diagram of a process of providing push information during a call-connected state by an electronic device according to an embodiment.

FIG. 21 is a flow diagram of a process of providing push information during a call-connected state by an electronic device according to an embodiment. Operations may be performed sequentially but are not required to be performed sequentially. For example, the order of the operations may be changed, and at least two operations may be performed in parallel.

Referring to FIG. 21, a second electronic device 2107 may transmit push information to a first server 2103 in operation 2110. For example, in the call-connected state with a first electronic device 2101, the second electronic device 2107 generates push information to be transmitted to the first electronic device 2101, based on a user input, and transmits the generated push information to the first server 2103. According to an embodiment, push information may include a URL.

According to an embodiment, the first server 2103 that receives the push information from the second electronic device 2107 may transmit the push information to the first electronic device 2101 in operation 2112. For example, the first server 2103 may transfer the push information received from the second electronic device 2107 to the first electronic device 2101 that is in the call-connected state with the second electronic device 2107.

According to an embodiment, the first electronic device 2101 that receives the push information from the first server 2103 may display a web screen corresponding to the URL included in the push information in operation 2112. The first electronic device may display dynamic call information corresponding to the call-connected state on a screen, and may display a web screen on a predetermined area of the screen. The predetermined area where the web screen is displayed may be the entirety or a part of the screen, and may be set and changed by a designer and/or a user. The web screen may be displayed via a popup window.

A communication connection network of the first electronic device 2101 and the second electronic device 2107 in FIG. 21 and a network via which push information is transmitted may be different from each other.

According to an embodiment, an operation method of an electronic device includes detecting that a call event associated with another electronic device occurs; obtaining call-related information associated with the other electronic device; detecting at least one piece of information corresponding to a call state with the other electronic device from the obtained call-related information; and displaying a screen including the at least one piece of detected information and information indicating the call state with the other electronic device.

According to an embodiment, the call-related information may include at least one of at least one piece of information corresponding to the call connection attempt state, at least one piece of information corresponding to a call-connected state, or at least one piece of information corresponding to a call-terminated state.

According to an embodiment, the call-related information may include at least one of common call-related information that is commonly applied to a plurality of electronic devices including the electronic device, or dedicated call-related information that is applied to the electronic device.

According to an embodiment, the method may further include storing, in the memory, at least one piece of information, based on a storage characteristic of each of the at least one piece of information included in the call-related information, and the storage characteristic is set as one of a volatile characteristic and a non-volatile characteristic.

According to an embodiment, the method may further include receiving additional information transmitted from the other electronic device during a call-connected state with the other electronic device; and displaying the additional information on the display.

According to an embodiment, the operation of displaying the screen including the at least one piece of detected information and the information indicating the call state with the other electronic device may include detecting that the call state with the other electronic device is changed; detecting at least one piece of information corresponding to the changed call state from the obtained call-related information; and displaying the screen including the at least one piece of information corresponding to the changed call state and the information indicating the changed call state.

According to an embodiment, the method may further include detecting a call-related information registration event associated with the electronic device; displaying a call-related information registration screen associated with the electronic device; receiving call-related information associated with the electronic device via a user input for the call-related information registration screen; and transmitting, to a server, the received call-related information associated with the electronic device.

According to an embodiment, the call-related information registration screen associated with the electronic device my include at least one of at least one item for receiving input of common call-related information that is commonly applied to a plurality of other electronic devices including the other electronic device, or at least one item for receiving input of dedicated call-related information that is applied to the other electronic device.

According to an electronic device and an operation method according to various embodiments, the electronic device may dynamically change information displayed on a screen according to a call state, thereby providing various information to a user.

According to an electronic device and an operation method according to an embodiment, the electronic device may register, in a server, various information for each call state, thereby providing, to a reception side electronic device, various information such as caller information, the purpose of an outgoing call, or the like.

The term "module" as used herein may, for example, indicate a unit including one of hardware, software, and firmware or a combination of two or more of them. The term "module" may be interchangeably used with, for example, the terms "unit", "logic", "logical block", "component", and "circuit". The term "module" may indicate a minimum unit of an integrated component element or a part thereof. The term "module" may indicate a minimum unit for performing one or more functions or a part thereof. The term "module" may be mechanically or electronically implemented. For example, the term "module" according to the present disclosure may include at least one of an application specific integrated circuit (ASIC), a field programmable gate array (FPGA), and a programmable-logic device for performing operations which are known or will be developed.

According to an embodiment, at least some of the devices (for example, modules or functions thereof) or the method (for example, operations) according to the present disclosure may be implemented by a command stored in a non-transitory computer-readable storage medium in a programming module form. The instruction, when executed by a processor (e.g., the processor 420), may cause the one or more processors to execute the function corresponding to the instruction. The non-transitory computer-readable storage medium may be, for example, the memory 430.

The non-transitory computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), a flash memory), and the like. In addition, the program instructions may include high level code, which may be executable by an interpreter, as well as machine level code made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to an embodiment of the present disclosure may be executed sequentially, in parallel, repeatedly, or in a heuristic manner. Furthermore, some operations may be executed in a different order or may be omitted, or other operations may be added. An embodiment disclosed herein is provided merely to easily describe technical details of the present disclosure and to facilitate understanding of the present disclosure, but are not intended to limit the scope of the present disclosure. Accordingly, the scope of the present disclosure is intended to be construed as including all modifications or various other embodiments based on the technical idea of the present disclosure.

The embodiments disclosed herein are provided to help with the description and comprehension of the disclosed technical contents, but are not intended to limit the scope of the present disclosure. Therefore, the scope of the present disclosure should be construed as including all modifications or various other embodiments based on the scope of the present disclosure as defined by the appended claims and their equivalents.

What is claimed is:

1. An electronic device, comprising:
   a display;
   a communication interface;
   at least one processor; and
   a memory electrically connected to the processor,
   wherein, upon execution, the memory is configured to store instructions that enable the at least one processor to:
      identify a current call progress state among a plurality of call progress states for a call associated with another electronic device;
      obtain call-related information associated with the another electronic device;
      select information corresponding to the current call progress state from the obtained call-related information; and
      control the display to display a screen including the selected information and information indicating the current call progress state,
   wherein the plurality of call progress states comprises a call connection attempt state, a call-connected state, and a call-terminated state, and
   wherein the call-related information includes at least two information of first call-related information corresponding to the call connection attempt state, second call-related information corresponding to the call-connected state, and third call-related information corresponding to the call-terminated state.

2. The electronic device of claim 1, wherein the memory is further configured to store instructions that enable the at least one processor to:
   in response to detecting a call event, transmit, to a server, a signal requesting transmission of the call-related information associated with the another electronic device, and
   receive, from the server, the call-related information associated with the another electronic device.

3. The electronic device of claim 1, wherein the call-related information further includes at least one of common call-related information that is commonly applied to a plurality of electronic devices including the electronic device, or dedicated call-related information that is applied to the electronic device.

4. The electronic device of claim 3, wherein the memory is further configured to store instructions that enable the at least one processor to:
   detect first information corresponding to the current call progress state from the common call-related information;
   detect second information corresponding to the current call progress state from the dedicated call-related information; and
   control the display to display a screen including the first information, the second information, and information indicating the current call progress state.

5. The electronic device of claim 3, wherein the memory is further configured to store instructions that enable the at least one processor to:

determine whether the dedicated call-related information is registered in a server, based on a received signal; and when the dedicated call-related information is registered in the server, control the communication interface to transmit a signal for requesting transmission of the call-related information associated with the another electronic device to the server.

6. The electronic device of claim 1, wherein the memory is further configured to store information, based on a storage characteristic associated with each of the information included in the communication-related information in the memory, and wherein the storage characteristic is set as one of a volatile characteristic and a non-volatile characteristic.

7. The electronic device of claim 6, wherein the memory is further configured to store instructions that enable the at least one processor to delete the call-related information associated with the another electronic device, based on the number of times that a call event associated with the another electronic device occurs.

8. The electronic device of claim 1, wherein the memory is further configured to store instructions that enable the at least one processor to:

receive additional information transmitted from the another electronic device during a call-connected state with the another electronic device; and control to display the additional information on the display.

9. The electronic device of claim 1, wherein the call-related information further includes at least one of an image, text, an animation image, a game, music, a video, a uniform resource locator (URL), weather, haptic data, handwriting, or three dimensional (3D) content, wherein at least a portion of the first call-related information is different from the second call-related information and the third call-information, wherein at least a portion of the second call-related information is different from the first call-related information and the third call-information, or wherein at least a portion of the third call-related information is different from the second call-related information and the first call-information.

10. The electronic device of claim 1, wherein the memory is further configured to store instructions that enable the at least one processor to:

detect that the current call progress state for the call is changed while the screen including the information indicating the current call progress state is displayed;

detect information corresponding to the changed call progress state from the obtained call-related information; and control the display to display a screen including the detected information corresponding to the changed call progress state and information indicating the changed call progress state.

11. The electronic device of claim 1, wherein the memory is further configured to store instructions that enable the at least one processor to:

detect a call-related information registration event associated with the electronic device;

control the display to display a call-related information registration screen associated with the electronic device;

receive call-related information associated with the electronic device via a user input for the call-related information registration screen; and control the communication interface to transmit the received call-related information associated with the electronic device to the server.

12. The electronic device of claim 11, wherein the call-related information registration screen associated with the electronic device includes at least one of at least one item for receiving input of common call-related information that is commonly applied to a plurality of other electronic devices, or at least one item for receiving input of dedicated call-related information that is applied to a designated electronic device.

13. A server, comprising:
a communication interface;
at least one processor; and
a memory electrically connected to the processor,
wherein, upon execution, the memory is configured to store instructions to enable at least one processor to:
obtain call-related information associated with at least one electronic device;
receive a signal for requesting call-related information associated with a second electronic device from a first electronic device; and
control the communication interface to transmit the call-related information associated with the second electronic device to the first electronic device in response to the received signal, and
wherein the call-related information includes at least two information of first call-related information corresponding to the call connection attempt state, second call-related information corresponding to the call-connected state, and third call-related information corresponding to the call-terminated state.

14. A method of an electronic device, comprising:
identifying a current call progress state among a plurality of call progress states for a call associated with another electronic device;
obtaining call-related information associated with the another electronic device;
selecting information corresponding to the current call progress state from the obtained call-related information; and
displaying a screen including the selected information and information indicating the current call progress state,
wherein the plurality of call progress states comprises a call connection attempt state, a call-connected state, and a call-terminated state, and
wherein the call-related information comprises at least two information of first call-related information corresponding to the call connection attempt state, second call-related information corresponding to the call-connected state, and third call-related information corresponding to the call-terminated state.

15. The method of claim 14, wherein the call-related information further includes at least one of common call-related information that is commonly applied to a plurality of electronic devices including the electronic device, or dedicated call-related information that is applied to the electronic device.

16. The method of claim 14, further comprising:
storing, in the memory, information, based on a storage characteristic of each of the information included in the call-related information,
wherein the storage characteristic is set as one of a volatile characteristic and a non-volatile characteristic.

17. The method of claim 14, further comprising:
receiving additional information transmitted from the another electronic device during a call-connected state with the another electronic device; and
displaying the additional information on the display.

18. The method of claim 14, wherein displaying the screen including the selected information and the information indicating the current call progress state with the another electronic device comprises:
detecting that the current call progress state is changed while the screen including the information indicating the current call progress state is displayed;
detecting information corresponding to the changed call progress state from the obtained call-related information; and
displaying the screen including the detected information corresponding to the changed call progress state and the information indicating the changed call progress state.

19. The method of claim 14, further comprising:
detecting a call-related information registration event associated with the electronic device;
displaying a call-related information registration screen associated with the electronic device;
receiving call-related information associated with the electronic device via a user input for the call-related information registration screen; and
transmitting, to a server, the received call-related information associated with the electronic device,
wherein the call-related information registration screen associated with the electronic device includes at least one of at least one item for receiving input of common call-related information that is commonly applied to a plurality of other electronic devices including the another electronic device, or at least one item for receiving input of dedicated call-related information that is applied to the another electronic device.

20. The method of claim 14, further comprising:
in response to detecting a call event, transmitting, to a server, a signal requesting transmission of the call-related information associated with the another electronic device; and receiving, from the server, the call-related information associated with the another electronic device.

* * * * *